United States Patent
Yun et al.

(10) Patent No.: US 10,861,221 B2
(45) Date of Patent: Dec. 8, 2020

(54) SENSORY EFFECT ADAPTATION METHOD, AND ADAPTATION ENGINE AND SENSORY DEVICE TO PERFORM THE SAME

(71) Applicant: ELECTRONICS AND TELECOMMUNICATIONS RESEARCH INSTITUTE, Daejeon (KR)

(72) Inventors: Jae-Kwan Yun, Daejeon (KR); Noh-Sam Park, Sejong (KR); Jong Hyun Jang, Sejong (KR); Mi Kyong Han, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/035,357

(22) Filed: Jul. 13, 2018

(65) Prior Publication Data

US 2019/0019340 A1    Jan. 17, 2019

(30) Foreign Application Priority Data

Jul. 14, 2017  (KR) .................. 10-2017-0089750
Jul. 6, 2018   (KR) .................. 10-2018-0078567

(51) Int. Cl.
  *G06T 19/00*   (2011.01)
  *G06T 15/20*   (2011.01)
  *G06F 3/01*    (2006.01)

(52) U.S. Cl.
  CPC ............. *G06T 15/20* (2013.01); *G06F 3/011* (2013.01)

(58) Field of Classification Search
  None
  See application file for complete search history.

(56) References Cited

U.S. PATENT DOCUMENTS

| | | | |
|---|---|---|---|
| 2012/0188256 A1* | 7/2012 | Lee .................. | G06T 13/00 345/473 |
| 2013/0038601 A1* | 2/2013 | Han .................. | G06T 13/40 345/419 |
| 2013/0088424 A1* | 4/2013 | Han .................. | G06N 3/006 345/156 |
| 2013/0103703 A1* | 4/2013 | Han .................. | H04N 21/4126 707/755 |
| 2014/0082465 A1* | 3/2014 | Jee .................. | G06F 17/24 715/202 |
| 2014/0148220 A1 | 5/2014 | Park et al. | |
| 2016/0284132 A1 | 9/2016 | Kim et al. | |
| 2016/0293213 A1* | 10/2016 | Kim .................. | G11B 27/036 |
| 2016/0364912 A1 | 12/2016 | Cho et al. | |
| 2016/0366396 A1 | 12/2016 | Kim et al. | |

FOREIGN PATENT DOCUMENTS

| | | |
|---|---|---|
| KR | 10-2011-0073161 A | 6/2011 |
| KR | 10-2014-0035713 A | 3/2014 |
| KR | 10-2014-0051040 A | 4/2014 |

* cited by examiner

*Primary Examiner* — Yanna Wu

(57) ABSTRACT

Provided is a sensory effect adaptation method performed by an adaptation engine, the method including identifying first metadata associated with an object in a virtual world and used to describe the object and converting the identified first metadata into second metadata to be applied to a sensory device in a real world, wherein the second metadata is obtained by converting the first metadata based on a scene determined by a gaze of a user in the virtual world.

4 Claims, 22 Drawing Sheets

Arrayed light effect ID 1

Arrayed light effect ID 2

Sequence of RGB matrices 4D theater with arrayed light actuators

SENSORY EFFECT ADAPTATION METHOD, AND ADAPTATION ENGINE AND SENSORY DEVICE TO PERFORM THE SAME

CROSS-REFERENCE TO RELATED APPLICATION(S)

This application claims the priority benefit of Korean Patent Application No. 10-2017-0089750 filed on Jul. 14, 2017 and Korean Patent Application No. 10-2018-0078567 filed on Jul. 6, 2018 in the Korean Intellectual Property Office, the disclosures of which are incorporated herein by reference for all purposes.

BACKGROUND

1. Field

One or more example embodiments relate to a sensory effect adaptation method, and an adaptation engine and a sensory device for performing the method and, more particularly, to sensory effect adaptation technology based on a scene viewed by a user in a virtual world and an object included in the scene.

2. Description of Related Art

A four-dimensional (4D) movie theater provides a sensory effect service that stimulate senses such as a sense of smell and a sense of touch to provide realistic multimedia contents. When contents and sensory effect are provided together, user immersion and satisfaction may increase.

A method of providing preset sensory effect on a time-by-time basis may provide sensory effect irrespective of a gaze of a user in a virtual world, which may reduce the user immersion and satisfaction. For example, a typical 4D movie theater may provide preset sensory effect corresponding to a time of a playback video irrespective of a gaze of a user.

Accordingly, research on a sensory effect service provided to a user is required such that a user experiences sensory effect corresponding to a scene viewed by the user and changed based on a gaze of the user in a virtual world.

SUMMARY

An aspect provides technology that may reproduce a sensory effect in response to a change in gaze of a user.

Another aspect also provides technology that may reproduce a sensory effect based on a user preference, environment information, and a sensory device performance.

According to an aspect, there is provided a sensory effect adaptation method performed by an adaptation engine, the method including identifying first metadata associated with an object in a virtual world and used to describe the object and converting the identified first metadata into second metadata to be applied to a sensory device in a real world, wherein the second metadata is obtained by converting the first metadata based on a scene determined by a gaze of a user in the virtual world.

The second metadata may be obtained by converting the first metadata based on environment information of the user, a preference of the user, a sensory device performance, and a sensor performance in addition to the scene determined by the gaze of the user.

The converting of the first metadata may further include generating a control command extensible markup language (XML) for controlling the sensory device, generating a SyncTable for time synchronization between an image and the control command XML, and transmitting the control command XML to the sensory device when the control command XML corresponding to a time in which the image is played is retrieved from the SyncTable.

According to another aspect, there is also provided a sensory effect adaptation method performed by a sensory device, the method including identifying a control command XML generated based on second metadata into which first metadata is converted, parsing the identified control command XML, generating a binary type control command, and controlling the sensory device using the generated binary type control command, wherein the second metadata is obtained by converting the first metadata associated with an object in a virtual world and used to describe the object.

The second metadata may be obtained by converting the first metadata based on environment information of the user, a preference of the user, a sensory device performance, and a sensor performance in addition to the scene determined by the gaze of the user.

According to still another aspect, there is also provided an adaptation engine including a processor, wherein the processor is configured to identify first metadata associated with an object in a virtual world and used to describe the object and convert the identified first metadata into second metadata to be applied to a sensory device in a real world, the second metadata being obtained by converting the first metadata based on a scene determined by a gaze of a user in the virtual world.

The second metadata may be obtained by converting the first metadata based on environment information of the user, a preference of the user, a sensory device performance, and a sensor performance in addition to the scene determined by the gaze of the user.

The processor may be configured to generate a control command XML, for controlling the sensory device, generate a SyncTable for time synchronization between an image and the control command XML, and transmit the control command XML to the sensory device when the control command XML corresponding to a time in which the image is played is retrieved from the SyncTable.

According to yet another aspect, there is also provided a sensory device including a processor, wherein the processor is configured to identify a control command XML generated based on second metadata into which first metadata is converted, parse the identified control command XML, generate a binary type control command, and control the sensory device using the generated binary type control command, the second metadata being obtained by converting the first metadata associated with an object in a virtual world and used to describe the object.

The second metadata may be obtained by converting the first metadata based on environment information of the user, a preference of the user, a sensory device performance, and a sensor performance in addition to the scene determined by the gaze of the user.

According to further another aspect, there is also provided a non-transitory computer-readable storage medium storing sensory effect data, wherein the sensory effect data includes information associated with an object in a virtual world and used to describe the object, the information includes an object identification (ID) flag representing an object ID presence and an object ID for identifying the object in the virtual world, and a list of sensory effects associated with the object identified using the object ID is included in a sensory effect list and whether to use a sensory effect included in the sensory effect list is determined based on a sensory effect list flag.

When the object ID flag is "1", the object corresponding to the object ID may be present. When the object ID flag is "0", the object corresponding to the object ID may be absent.

According to still another aspect, there is also provided a non-transitory computer-readable storage medium storing sensory effect data, wherein the sensory effect data includes a sensory effect list for describing an object in a virtual world, the sensory effect list is a list of sensory effects associated with the object in the virtual world, and whether to use a sensory effect included in the sensory effect list is determined based on a sensory effect list flag.

When the sensory effect list flag is "1", the sensory effect included in the sensory effect list may be used. When the sensory effect list flag is "0", the sensory effect included in the sensory effect list may not be used.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
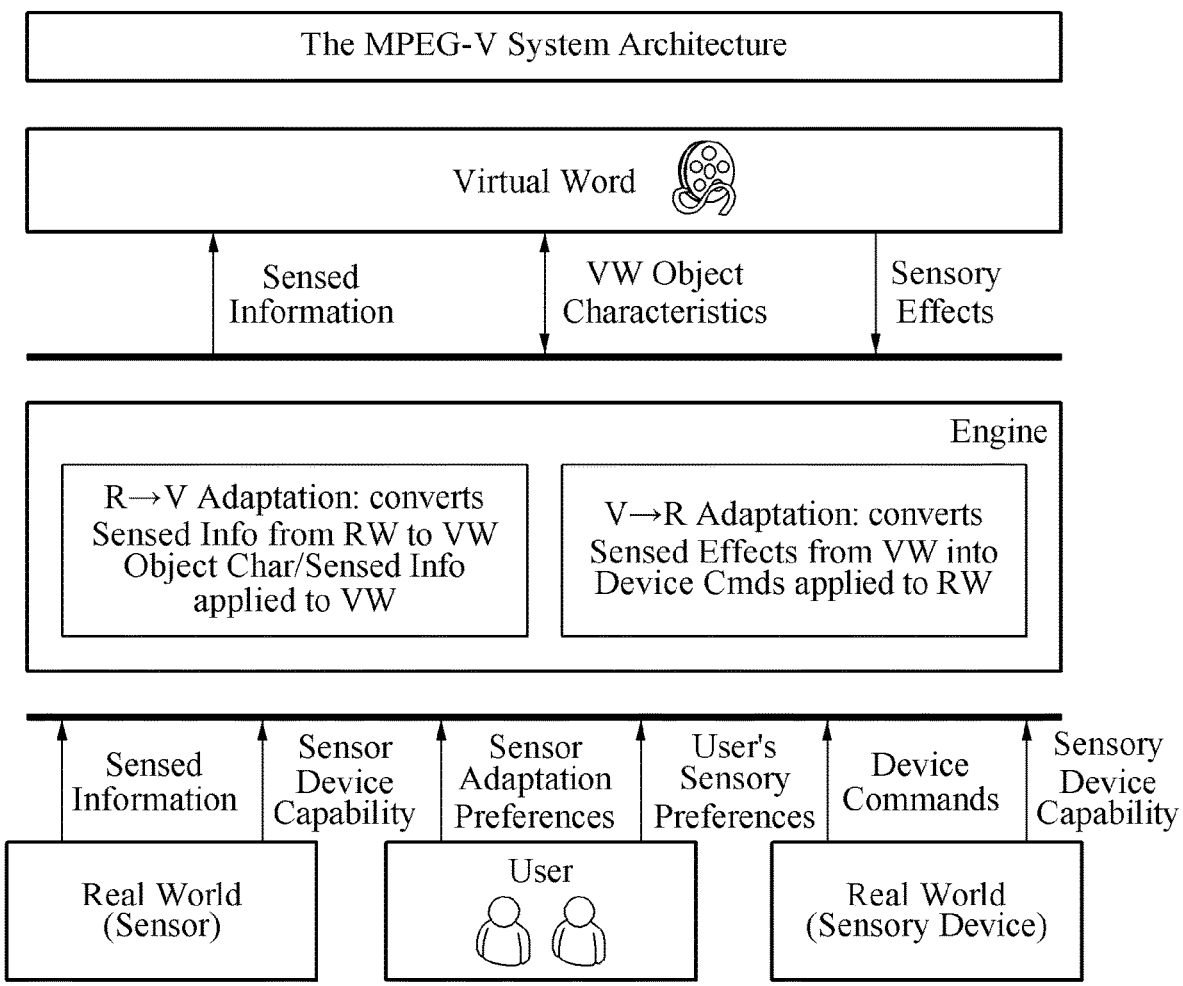
FIG. 1 is a diagram illustrating an overall system architecture of a moving picture experts group-virtual (MPEG-V) framework according to an example embodiment.

Hereinafter, example embodiments will be described in detail with reference to the accompanying drawings.

It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween.

The terminology used herein is for describing various examples only, and is not used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Abbreviated Terms

CT—common types
DIA—digital item adaptation (ISO/IEC 21000-7)
SEDL—sensory effects description language
SEM—sensory effect metadata
SEV—sensory effects vocabulary
UMA—universal multimedia access
UME—universal multimedia experience
REL—rights expression language
URI—uniform resource identifier
URL—uniform resource locator
XML—extensible markup language
XSI—XML streaming instructions Terms and Definitions Device command—description of controlling actuators used to generate sensory effects Sensed information—information acquired by sensors Sensor—a device such as a temperature sensor, a distance sensor, a motion sensor, and the like by which a user input or environment information is to be collected Sensor adaptation preferences—description schemes and descriptors to represent preferences of a user with respect to sensed information being adapted Sensor capability—description of representing characteristics of sensors in terms of a capability of a sensor such as accuracy or a sensing range Sensory device—a consumer device by which a corresponding sensory effect is made while a real-world device incorporates any combination of sensors and actuators in a single device Sensory device capability—description of representing characteristics of actuators used to generate sensory effects in terms of a capability of a device Sensory effect—effects to augment perception by stimulating human senses in a specific scene, for example, scent, wind, lightings, haptics, kinesthetic-force, stiffness, weight, friction, texture, widget such as a button, a slider, and a joystick, tactile, air-jet, suction pressure, thermal, current, and vibration Sensory effect metadata—metadata that defines description schemes and descriptors to represent the sensory effect User sensory preferences—description schemes and descriptors to represent user preferences with respect to rendering of the sensory effect Use of Prefixes A prefix "xsi" refers to an element of a namespace of http://www.w3.org/2001/XMLSchema-instance.

A prefix "xml" is bound to http://www.w3.org/XML/1998/namespace by definition. A prefix "xmlns" is used for namespace binding and is not bound to a namespace name.

System Architecture

FIG. 1 is a diagram illustrating an overall system architecture of a moving picture experts group-virtual (MPEG-V) framework according to an example embodiment.

A system architecture of an MPEG-V framework may be used to serve three media exchanges. There are two types of media exchanges occurring between a real world and a virtual world, for example, an information exchange from the real world to the virtual world and an information exchange from the virtual world to the real world. An additional type of media exchange is an information exchange between virtual worlds.

To represent 18 types of sensory effects, the adaptation engine may provide sensory effect metadata (SEM) including, for example, a light effect, a flash effect, a temperature effect, a wind effect, a vibration effect, a spraying effect, a scent effect, a fog effect, a color correction effect, a rigid body motion effect, a passive kinesthetic motion effect, a passive kinesthetic force effect, an active kinesthetic effect, a tactile effect, a parameterized tactile effect, and a bubble effect.

In an example, the adaptation engine may provide the SEM for representing the 18 types of sensory effects using SEMBaseType as shown in Table 1 below.

TABLE 1

```
<complexType name="SEMBaseType" abstract="true">
<complexContent>
<restriction base="anyType">
<attribute name="id" type="ID" use="optional"/>
</restriction>
</complexContent>
</complexType>
```

According to SEMBaseType, the 18 types of sensory effects may be classified by an ID. A sensory effect corresponding to the ID may be activated and/or deactivated based on a media playback time. For example, light effect corresponding to id="Light1" may be activated and/or deactivated based on a media playback time.

One ID may correspond to one sensory effect. Different IDs may be used to represent the same sensory effects or different sensory effects. Also, similarly to the different sensory effects, at least two IDs may be used to represent at least two same effects. For example, sensory effects may be classified based on IDs. Also, a sensory effect corresponding to a predetermined condition, for example, duration, activate, location, intensity-value, and intensity-range may be represented at a predetermined time.

TABLE 2

```
<sedl:Effect xsi:type="sev:TemperatureType" id="Temp1" si:pts="8100" duration="2000"
activate="True" location=":WCS:Left:Top:Back" intensity-value="100" intensity-range="0
100" />
<sedl:Effect xsi:type="sev:LightType" id="Light1" si:pts="8100" duration="3000"
activate="True" location=":WCS:Left:Top:Back" color="#FF0000" intensity-value="100"
intensity-range="0 100" />
<sedl:Effect xsi:type="sev:LightType" id="Light2" si:pts="16750" duration="2000"
activate="True" location=":WCS:Left:Top:Front" color="#0000FF" intensity-value="100"
intensity-range="0 100" />
<sedl:Effect xsi: type="sev:FlashType" id="Flash1" si:pts="16750" duration="1000"
activate="True" location=":WCS:Left:Top:Back" frequency="255" color="#FFTFFF"
intensity-value="100" intensity-range="0 100" />
<sedl:Effect xsi: type="sev: ScentType" id="Scent1" si:pts="7900" duration="3000"
activate="True" location=":WCS:Left:Top:Back" scent=":SCENT:rose" intensity-
value="100"
intensity-range="0 100" />
<sedl:Effect xsi:type="sev:AirjetType" id="Air1" si:pts="5050" duration="500"
activate="True" location=":WCS:Left:Top:Back" intensity-value="100" intensity-range="0
100" />
<sedl:Effect xsi: type="sev:WindType" id="Wind1" si:pts="1500" duration="3000"
activate="True" location=":VVCS:CenterRight:Middle:Front" intensity-value="55" intensity-
range="0 100" />
<sedl:Effect xsi:type="sev:VibrationType" id="Vib1" si:pts="9100" duration="3000"
activate="True" location=":WCS:Center:Middle:Midway" intensity-value="50" intensity-
range="0 100" />
<sedl:Effect xsi:type="sev:WaterSprayerType" id="Water1" si:pts="14100" duration="300"
activate="True" location=":WCS:CenterRight:Bottom:Front" intensity-value="30" intensity-
range="0 100" />
<sedl:Effect xsi type="sev:FogType" id="Fog1" si:pts="0" duration="3000" activate="True"
location=":WCS:Center:Middle:Front" intensity-value="50" intensity-range="0 100" />
<sedl:Effect xsi:type="sev:BubbleType" id="Bubble1" si:pts="7600" duration="5000"
activate="True" location":WCS:Center:Bottom:Front" intensity-value="250" intensity-
range="0 100" />
<sedl:Effect xsi:type="sev:ArrayedLightType" updateRate="2" activate="true" si:pts="2">
<sev:LightSamples mpeg7:dim="6 12">
#000000 #0000FF #0000FF #0000FF #0000FF #000000
    #000000 #0000FF #000000 #000000 #000000 #000000
    #000000 #0000FF #0000FF #0000FF #0000FF #000000
    #000000 #0000FF #000000 #000000 #000000 #000000
    #000000 #0000FF #000000 #000000 #000000 #000000
    #000000 #0000FF #0000FF #0000FF #0000FF #000000
    #0000FF #0000FF #0000FF #0000FF #000000 #000000
    #0000FF #000000 #000000 #000000 #000000 #000000
    #0000FF #0000FF #0000FF #0000FF #000000 #000000
    #0000FF #000000 #000000 #000000 #000000 #000000
    #0000FF #000000 #000000 #000000 #000000 #000000
    #0000FF #000000 #0000FF #0000FF #000000 #000000
</sev:LightSamples>
</sedl:Effect>
```

A sensory effect associated with a scene viewed by a user may be reproduced based on media playback time information and information on an object in a scene. When a user in a virtual reality or an augmented reality is viewing a specific scene of an image For example, considering the current field of view of the user, it is not desirable that a 3D light effect is reproduced from a left side of a field of view of a user when a user in a virtual reality or an augmented reality is viewing a front scene of an image corresponding to 360°. Also, when a user in a virtual reality or augmented reality is viewing a scene where a ski jump is being produced, it is desirable to move a motion chair capable of expressing the ski jump in accordance with the scene.

Object reference information and an ID for expressing the sensory effect may be represented as shown in Table 3 below. The object reference information may include "objectIDRef." "objectIDRef" may indicate an ID reference of another effect referenced with respect to the sensory effect. For example, "objectIDRef" may have trajectory information associated with an ID corresponding to a current sensory effect as a reference.

TABLE 3

```
<complexType name="SEMBaseType" abstract="true">
<complexContent>
<restriction base="anyType">
<attribute name="id" type="ID" use="optional"/>
<attribute name="objectIdRef" type="anyURI" use="optional"/>
</restriction>
</complexContent>
</complexType>
```

When the scene is continuous, information on a trajectory on which the object moves may be set in advance. Also, the current sensory effect may be connected to the information. When a portion of the trajectory overlaps a screen area of a gaze of the user, the information on the trajectory may be used to convert the current sensory effect into a sensory effect corresponding to a direction in which the user gazes at. When sensory effect metadata for a motion chair is generated from an image acquired using a 360-degree camera or a 360-degree VR camera, a motion of the motion chair may vary based on a scene viewed by the user. For this, the information on the trajectory on which the object moves may be stored additionally.

Figure 2:
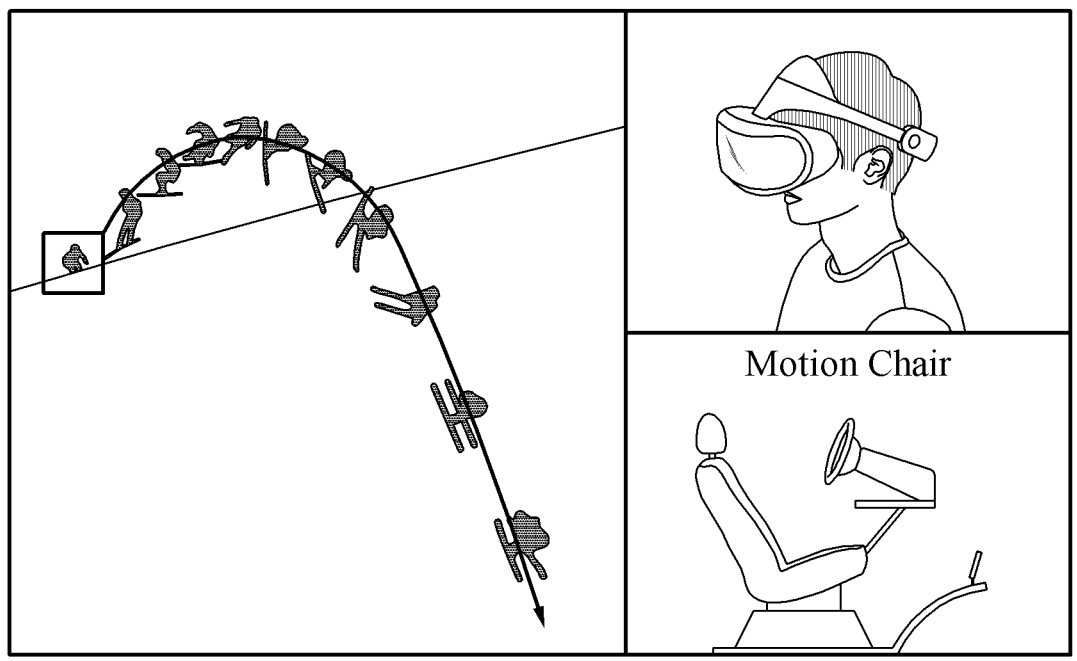
FIG. 2 is a diagram illustrating a representation example of a motion chair according to an example embodiment.

FIG. 2 is a diagram illustrating a representation example of a motion chair according to an example embodiment. Referring to FIG. 2, information on a trajectory of a motion of an object performing a ski jump may be stored based on a moving trajectory of the object. When a gaze of a user is at a left side, a motion of a motion chair may be controlled based on information on a trajectory changed based on a leftward gaze of the user. As such, the information on the trajectory may be changed based on the gaze of the user such that the motion of the motion chair is controlled based on the changed information.

Arrayed Light Effects

In terms of rich media, realistic media coupled and/or assisted with target devices may enhance user experiences on media consumption and thus, may be beneficial to users. Business market such as 4D cinema may be enriched by coupling media and devices together. A plurality of devices may be used to enhance realistic experiences, which may simulate effects of light, wind, flash, and the like.

When creating a 4D movie, a light effect may be used to express a mood or warmth of a space. An arrayed light effect may be used to augment events in a story with a high resolution by expressing complex light sources with an array of light display actuators.

Figure 3A:
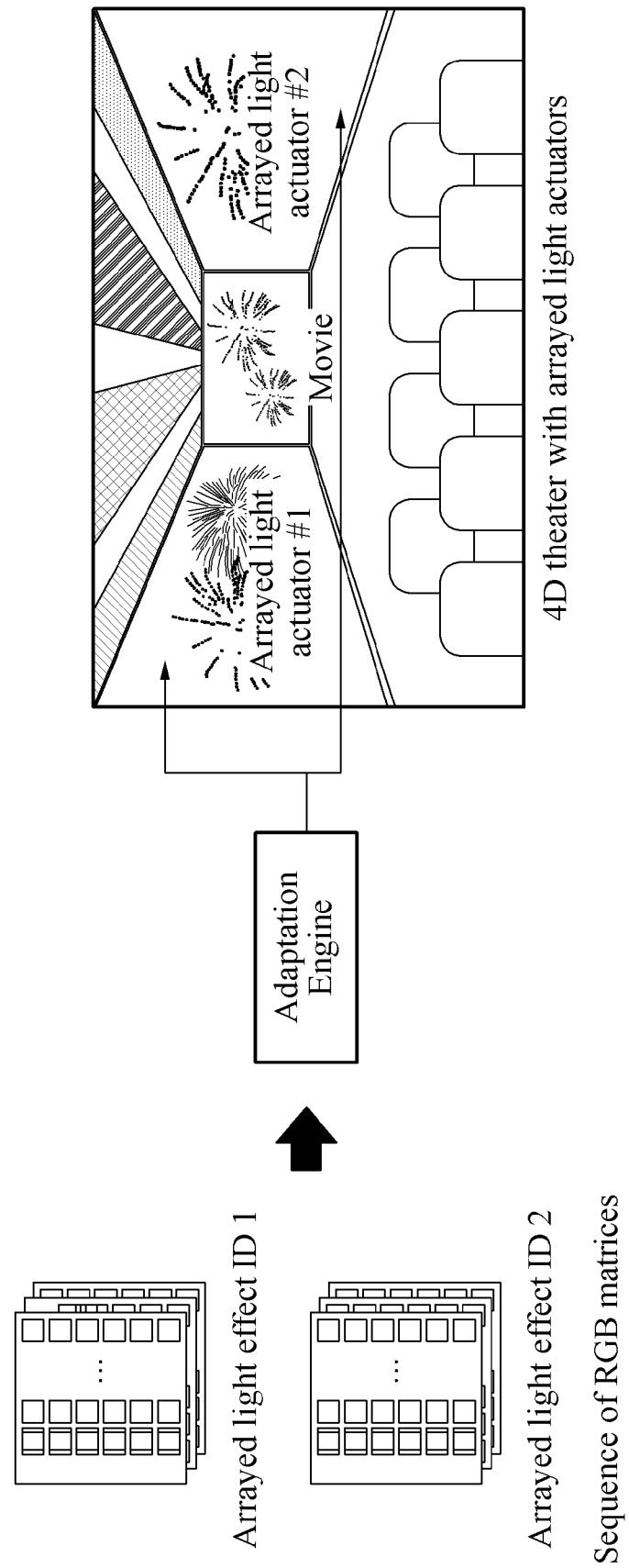
FIG. 3A is a diagram illustrating an arrayed light effect application example in which visual effect of firework is simulated in conjunction with an explosion event occurring in a movie viewed with two arrayed light actuators in a four-dimensional (4D) theater according to an example embodiment.

FIG. 3A illustrates a use case of an arrayed light effect in which a firework visual effect is simulated in synchronization with an explosion event occurring in a movie with two arrayed light actuators in a 4D theater. The 4D theater may have a large main screen in front of 4D chairs and two light display actuators on the left and right sides.

While a video of fireworks is played on the large main screen, the arrayed light effect represented with a sequence of m-by-n matrices may be simulated by the light display actuators based on a timeline of movie contents. A source of the arrayed light effect may be light sequences including an m-by-n matrix mapped to a light display actuator or a file of a video or an image including the m-by-n matrix.

When a wall or a space is configured as a light wall using light sequences instead of reproducing a sensory effect using a single lighting or a plurality of lightings, a light effect may change based on a gaze of a user in a virtual world. In this example, an ambient light sequence may be changed in response to a change in color or motion of an object included in a scene of an image viewed by a user. The arrayed light effect may include a sequence of RGB matrices.

Figure 3B:
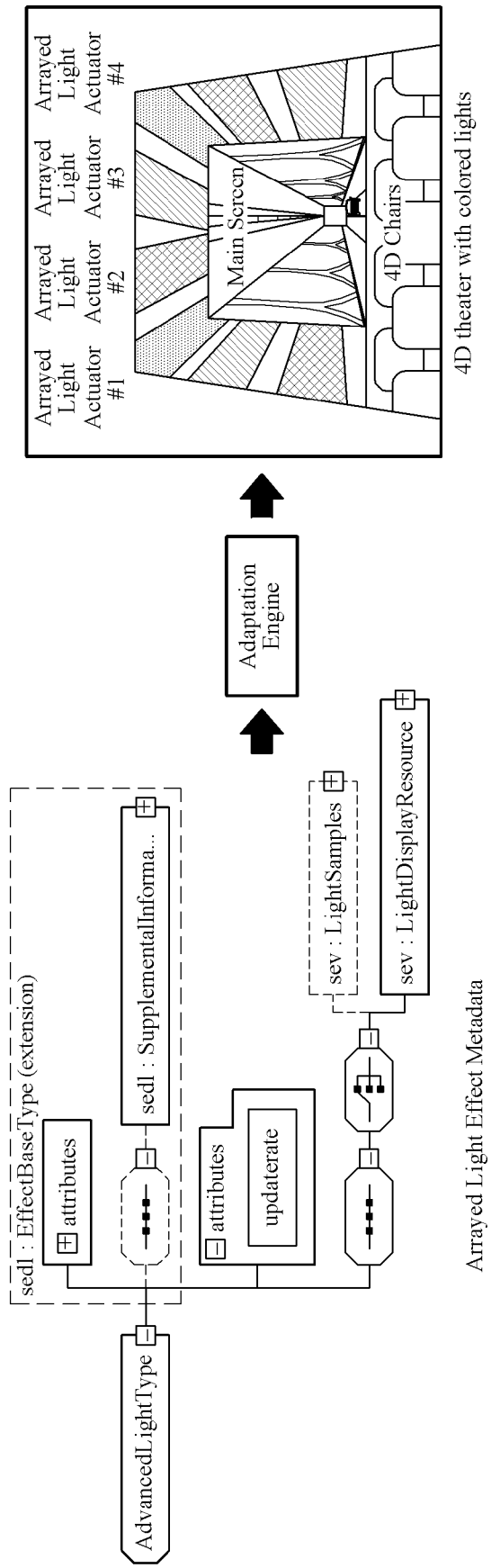
FIG. 3B is a diagram illustrating an example of an arrayed light effect applied in a 4D theater for visually augmenting a vehicle which is passing a tunnel with color lightings according to an example embodiment.

FIG. 3B illustrates a use case of an arrayed light effect for visually augmenting a vehicle that is passing through a tunnel with colored lights in a 4D theater. When the vehicle is passing through a tunnel with red, blue, and green lights, an effect editor may add an arrayed light effect to allow a viewer to experience the same light effect as a passenger in the vehicle.

The arrayed light effect metadata may be authored by an editor unaware of a capability or a number of light display actuators installed in the theater. The adaptation engine may generate a device command for actuating an appropriate light actuator by analyzing and extending the arrayed light effect metadata.

For example, an editor may author arrayed light effect metadata while the editor is unaware that the number of light display actuators is four. The editor may generate the arrayed light effect metadata under the assumption that the number of light display actuators is two.

The adaptation engine may analyze and convert the arrayed light effect metadata generated by the editor, thereby playing an optimized video in a theater having four light display actuators.

Syntax of the arrayed light effect may be represented as shown in Table 4 below.

TABLE 4

```
<!--.#####################################################.-->
<!--.SEV.Arrayed.Light.type.-->
<!--.#####################################################.-->
<complexType.name="ArrayedLightType">
<complexContent>
<extension.base="sedl:EffectBaseType">
<sequence>
<choice>
<element.name="LightSamples".type="sev:colorMatrixType"/>
<element.name="LightResource". type="sev:LightResourceType"/>
</choice>
</sequence>
<attribute.name="updateRate".type="positiveInteger".use="optional"/>
</extension>
</complexContent>
</complexType>
.
<complexType.name="colorMatrixType">
<simpleContent>
<extenson.base="sev:colorVector">
<attribute.ref="mpeg7:dim".use="required"/>
</extension>
</simpleContent>
</complexType>
.
<simpleType. name="colorVector">
<list.itemType="ct:colorType"/>
</simpleType>
.
<complexType.name="LightResourceType">
<attribute.name="type".type="string".use="required"/>
<attribute.name="ref".type="anyURI".use="required"/>
</complexType>.
```

Syntax of a capability of an arrayed light device may be represented as shown in Table 5 below.

TABLE 5

```
<complexType.name="ArrayedLightCapabilityType">
<complexContent>
<extension.base="dcdv:LightCapabilityType">
<attribute.name="maxRows".type="nonNegativeInteger".use="optional"/>
<attribute.name="maxColumns".type="nonNegativeInteger". use="optional"/>
</extension>
</complexContent>
</complexType>
```

Syntax of a user preference on arrayed lights may be represented as shown in Table 6 below.

TABLE 6

```
<complexType.name="ArrayedLightPrefType">
<complexContent>
<extension.base="sepv:LightPrefType">
<attribute.name="minintensity".type="integer".use="optional"/>
</extension>
</complexContent>
</complexType>
```

Syntax of a device control command of arrayed lights may be represented as shown in Table 7 below.

TABLE 7

```
<complexType.name="ArrayedLightType">
<complexContent>
<extension.base="iidl:DeviceCommandBaseType">
<element.name="LightSamples".type="mpegvct:colorMatrixType".
minOccurs="0"/>
</extension>
</complexContent>
</complexType>
```

Figure 4:
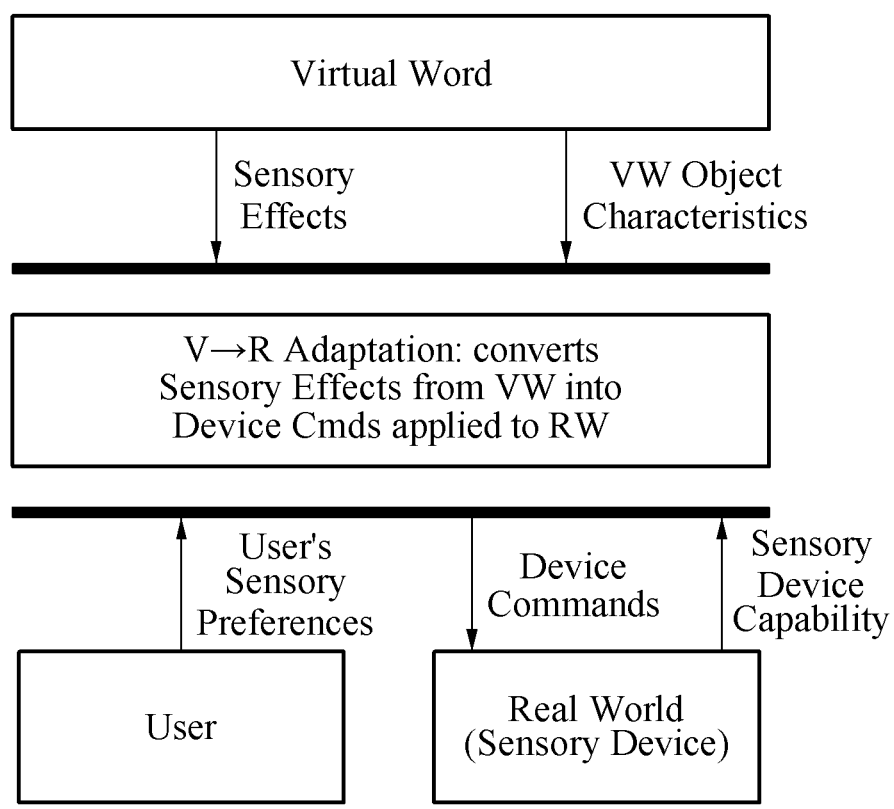
FIG. 4 is a diagram illustrating information adaptation from a virtual world to a real world according to an example embodiment.

Three Types of Media Exchanges i) Information Adaptation from Virtual World to Real World FIG. 4 illustrates information adaptation from a virtual world to a real world according to an example embodiment.

FIG. 4 illustrates a V=>R adaptation engine that generates output data based on sensory effect metadata, virtual world (VW) object characteristics, a sensory device capability, a actuator capability, a device command, a user sensory preference, and input data.

A virtual world within a framework may be referred to as an entity that functions as a source of sensory effect metadata and VW object characteristics such as a broadcaster, content creator/distributor, or a service provider. The V=>R adaptation engine may be an entity that receives the sensory effect metadata, a sensory device capability, for example, an actuator capability, and a user sensory preference as inputs and generates a device command based on the inputs so as to control a consumer device ensuring a worthwhile and informative experience of the user.

A real world device, for example, a sensory device may be an entity that functions as a sink of a device command and operates as a source of a sensory device capability. Additionally, entities that provide user sensory preferences towards a RoSE engine may also be collectively referred to as real world devices. Sensory devices, for example, actuators may be a sub-set of real world devices including fans, lights, scent devices, and human input devices such as a TV set with a remote control, for example, for preferences.

Actual sensory effect metadata may provide means of representing sensory effects, for example, effects to augment feeling by stimulating human sensory organs in a specific scene of a multimedia application. The sensory effects may be, for example, scent, wind, and light. Means of transporting such type of metadata may be referred to as a sensory effect delivery format which is combined with an audio/visual delivery format, for example, MPEG-2 transport stream, a file format, and real-time transport protocol (RTP) payload format.

The sensory device capability may define a description format to represent a sensory effect associated with characteristics of the sensory device and a performing method. A sensory device may be a consumer device by which a corresponding sensory effect, for example, lights, fans, heater, and fan is to be implemented. A device command may be used to control the sensory devices. As for the sensory effect metadata, the sensory device capability, and the device command, corresponding means of transporting such assets may be referred to as a sensory device capability/command delivery format.

The user sensory preference may be used to describe a preference of an actual or end user with respect to rendering of sensory effects for a delivery format.

ii) Information Adaptation from Real World to Virtual World

Figure 5:
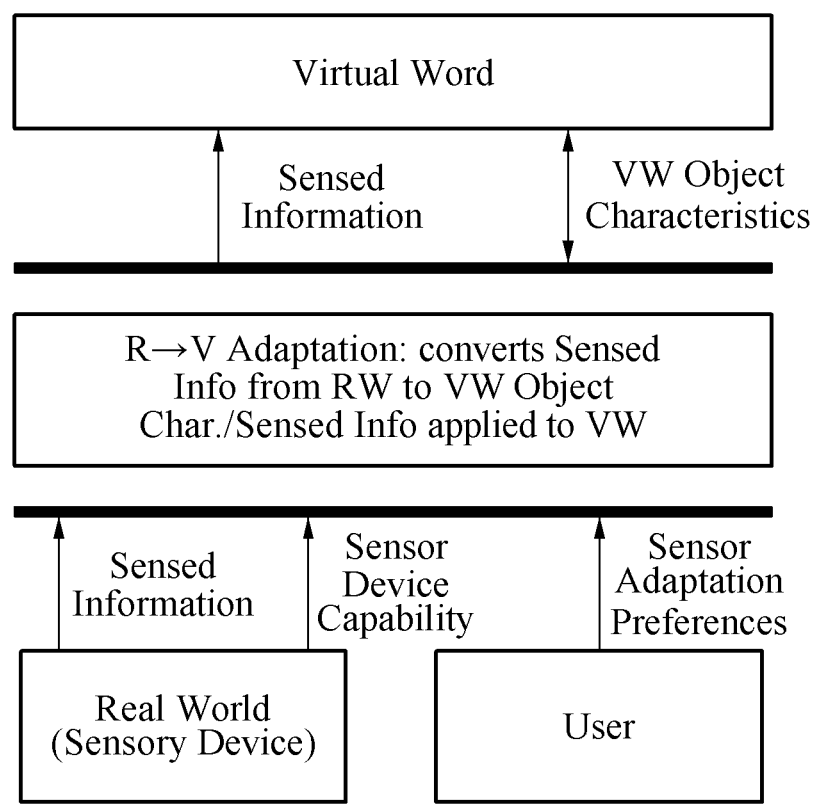
FIG. 5 is a diagram illustrating information adaptation from a real world to a virtual world according to an example embodiment.

FIG. 5 is a diagram illustrating information adaptation from a real world to a virtual world according to an example embodiment.

FIG. 5 illustrates real world to virtual world (R2V) adaptation including a VW object characteristic, sensed information, a sensor capability, a sensor adaptation preference, and an R=>V adaptation engine that generates output data based on input data.

An entity may process the sensed information from the real world in order to be consumed within a context of the virtual world, may fetch the sensed information from the virtual world irrespective of a presence of the VW object characteristic, the sensor adaptation preference from a user, and/or the sensor capability from a sensor, and may control the VW object characteristic by adapting the sensed information based on the sensor capability and/or the sensor adaptation preference or adapt the sensed information.

Two systems may be implemented to adapt information from the real world to the virtual world. In one implemented system, R=>V adaptation may fetch the sensor capability as an input, the sensed information from the sensor, and the sensor adaptation preference from the user and may adapt the sensed information based on the sensor capability and/or the sensor adaptation preference.

In the other implemented system, R=>V adaptation may fetch the sensed information from the virtual world irrespective of a presence of the VW object characteristic, the sensor adaptation preference from the user, and/or the sensor capability from the sensor and may control the VW object characteristic adapting the sensed information based on the sensor capability and/or the sensor adaptation preference.

iii) Information Adaptation Between Virtual Worlds

Figure 6:
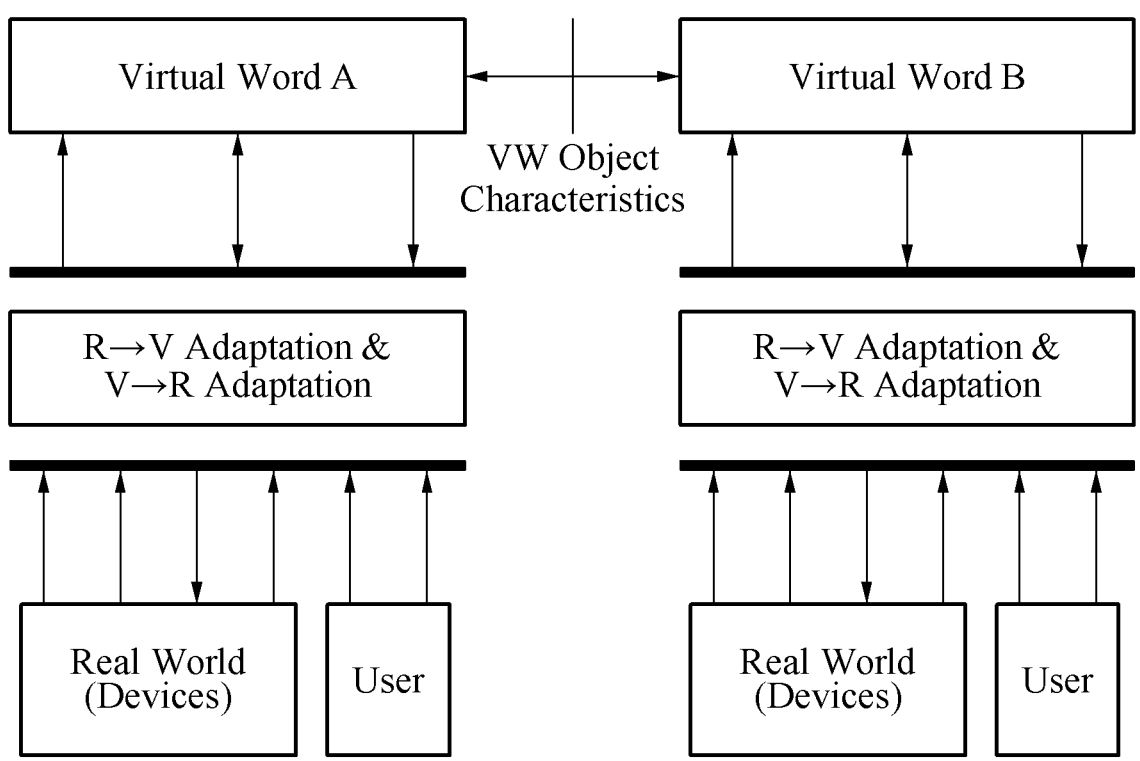
FIG. 6 is a diagram illustrating information exchange between virtual worlds according to an example embodiment.

FIG. 6 is a diagram illustrating information adaptation between virtual worlds according to an example embodiment.

FIG. 6 illustrates information adaptation including VW object characteristics which generate exchangeable information in virtual worlds.

V=>V adaptation may adapt proprietary VW object characteristics to VW object characteristics in a virtual world and send the VW object characteristics from the virtual world to another virtual world to support interoperability. Based on data provided in the VW object characteristics, the virtual world may internally adapt its own representation for a virtual object avatar.

Figure 7:
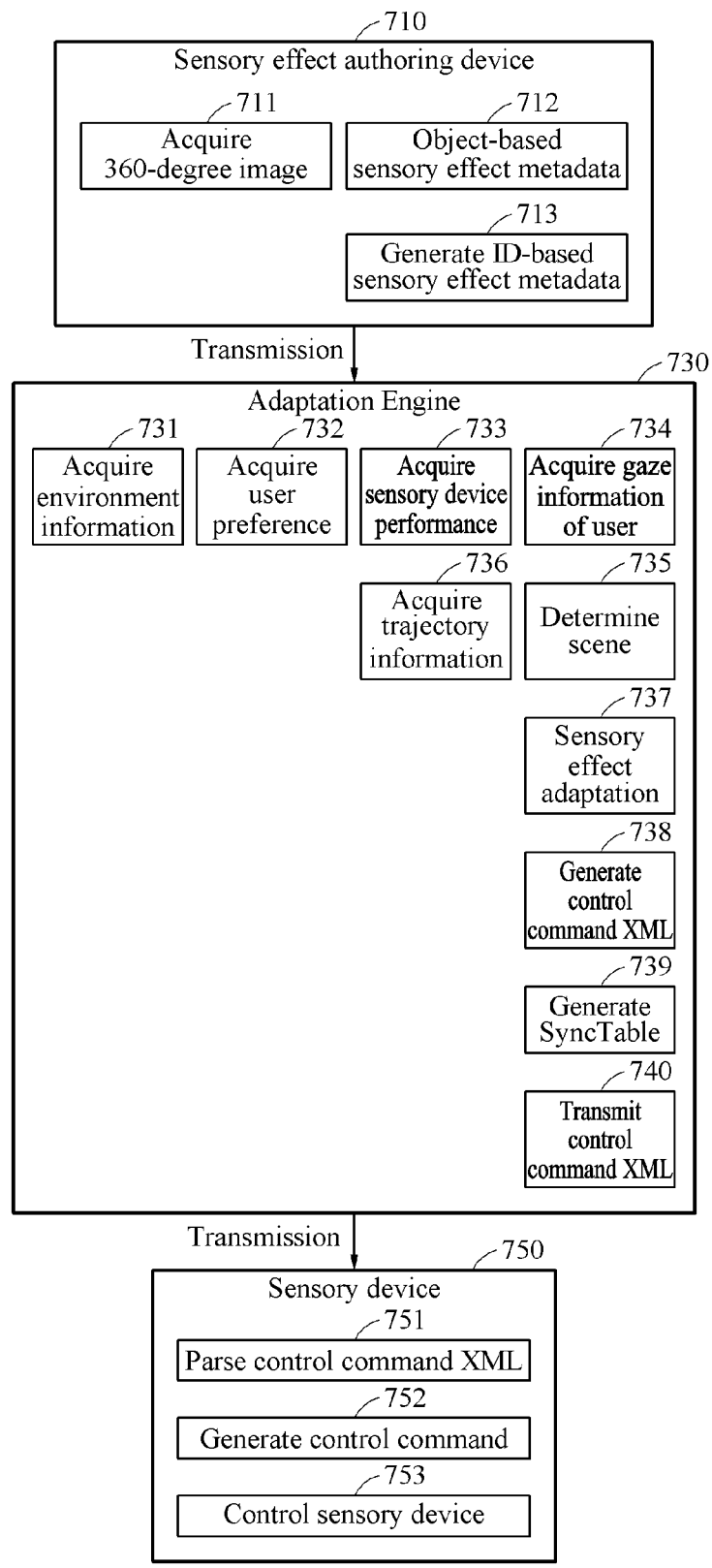
FIG. 7 is a diagram illustrating a sensory effect authoring device for authoring a sensory effect, an adaptation engine for converting the authored sensory effect to be reproduced in a sensory device, and the sensory device for reproducing the sensory effect according to an example embodiment.

FIG. 7 is a diagram illustrating a sensory effect authoring device for authoring a sensory effect, an adaptation engine for converting the authored sensory effect to be reproduced in a sensory device, and the sensory device for reproducing the sensory effect according to an example embodiment.

A sensory effect authoring device 710 may acquire a 360-degree image using a VR camera or a 360-degree camera in operation 711. The sensory effect authoring device 710 may generate sensory effect metadata 712 based on an object included in the 360-degree image. The sensory effect authoring device 710 may generate sensory effect metadata 713 based on an ID corresponding to a scene viewed by a user in the 360-degree image.

The generated sensory effect metadata 712 and 713 and the 360-degree image acquired in operation 711 may be transmitted in a form of file suitable to be transmitted, received, or downloaded through, for example, the wired or wireless Internet, Wi-fi, and Zigbee.

An adaptation engine 730 may receive the 360-degree image and the sensory effect metadata 712 and 713. The adaptation engine 730 may convert the received sensory effect metadata 712 and 713 into a form suitable to be represented in a user environment.

The adaptation engine 730 may acquire user environment information using a sensor in operation 731. The acquired user environment information may be used to effectively represent the sensory effect metadata 712 and 713. For example, when environment information acquired using the sensor includes data "bright" measured using a brightness measurer, a sensory effect corresponding to the data "bright" in sensory effect metadata may not be represented.

The adaptation engine 730 may acquire a user preference in operation 732. In this example, based on the user preference, a sensory effect that a user does not prefer may be removed or changed to be represented. In an example, a pregnant person may dislike strong stimuli, for example, sound, light, and scent. In this example, when the user preference is set as "weak" or "neglect," few or no sensory effects corresponding to the strong stimuli may be represented.

The adaptation engine 730 may acquire a sensory device performance in operation 733. Authored sensory effect metadata may be represented to be appropriate for the sensory device performance. For example, wind may be represented using a fan. When representing the wind using the fan at 100%, a control command of the fan may be a third level or a fifth level depending on a performance of the fan.

The adaptation engine 730 may acquire gaze information of the user in operation 734. The gaze information may be used to determine a specific scene viewed by the user in the 360-degree image. The user may view a portion of the 360-degree image instead of the entire 360-degree image.

The adaptation engine 730 may determine a scene based on the gaze information in operation 735. The adaptation engine 730 may extract objects included in the determined scene and acquire trajectory information of the extracted objects in operation 736. The acquired trajectory information may be used to determine a scene in response to a gaze moving.

The adaptation engine 730 may convert the sensory effect metadata 712 and 713 generated in the sensory effect authoring device 710 into a form suitable to be reproduced in a user environment through a sensory effect adaptation 737.

After the sensory effect adaptation 737 is performed, the adaptation engine 730 may generate a control command XML for controlling a sensory device 750 in operation 738. To reproduce a sensory effect according to a time in which a video is played, the adaptation engine 730 may generate a SyncTable for synchronization between a video playback time and a control command XML time in operation 739. When the control command XML time corresponding to the video playback time is retrieved in the SyncTable while the video is played, a control command XML corresponding to the retrieved control command XML time may be transmitted to the sensory device 750 in operation 740.

The sensory device 750 may receive the control command XML, parse the received control command XML in operation 751, generate a control command in a binary form instead of an XML in operation 752, and control a sensory device in operation 753 using an interface such as a wired or wireless network, serial, Bluetooth, and the like.

According to an example embodiment, a sensory device may provide all senses that a user feels in a real world to a user in a virtual world. The sensory effect may be differently provided based on a scene corresponding to a view of the user and an object included in the scene. For this, the adaptation engine may determine the scene corresponding to the view of the user and moving distance and direction of the user based on 6 degrees of freedom (6 DoF) data (for example, yaw/pitch/roll 3 DoF+user's spatial position change).

Figure 8:
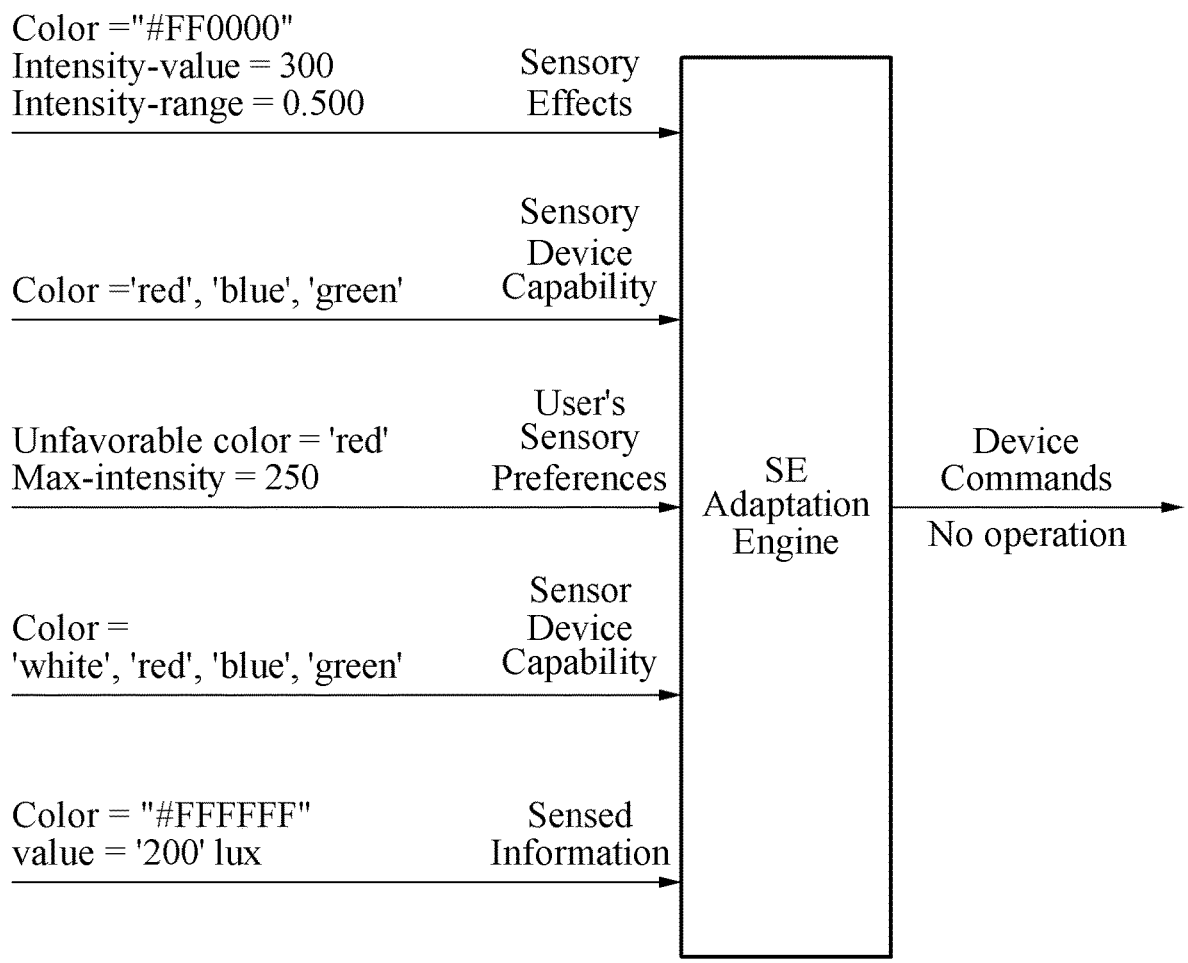
FIG. 8 is a diagram illustrating an adaptation engine operating based on a sensory device performance, a user preference, a sensor performance, and environment information according to an example embodiment.

FIG. 8 is a diagram illustrating an adaptation engine considering a user preference according to an example embodiment.

When a light effect is to be authored, an author or an editor may not consider the entire environment in which the light effect is reproduced. Thus, the author or the editor may determine the light effect based on a scene in a 360-degree image at a time in which the light effect is authored or an object included in the scene.

For example, when the author is to represent a red color in a firework scene, the author may set the red to 300 under an assumption that a representation capability of a sensory device ranges from 0 to 500 and may transmit sensory effect metadata generated in a sensory effect authoring device.

In this example, a sensory device capability may represent "red, blue, and green," environment information may be measured to be approximately "red" by a sensor that measures "white, red, blue, and green," and a user may not prefer "red." An adaptation engine may transmit a control command XML indicating "No operation" that is close to "Neglect."

In the similar situation, when the user does not prefer "green," "red" may be represented as the author having intended at the time in which the light effect is authored.

Virtual World Object Metadata

A specificity of a virtual environment (VE) with respect to other multimedia applications may include a representation of virtual world objects in the environment. The virtual world objects may be classified into two types: an avatar and a virtual object. The avatar may be used as a visual representation of a user in the environment. The virtual world objects may be used for different purposes as follows.

The virtual world objects may be used to: i) characterize various kinds of objects in the VE; and ii) provide an interaction with the VE.

Even though some components of an object are related to a virtual environment (for example, an avatar wearing a medieval suit may be inappropriate for a contemporary-style virtual environment), the object may need to be created, imported, and used in other virtual environments. For this, the object may be controlled in an external application, for example, an emotion which one avatar exposed in a virtual environment obtains by processing physiological sensors of a related user. A current virtual world object characteristics XSD may describe an object based on three requirements as follows:

i) easiness of creating importers/exporters from various VE implementations;

ii) easiness of controlling an object in a VE; and iii) easiness of modifying a proprietary template (corresponding to the virtual world) of the object by using data included in a virtual world object characteristic file.

Once the object is created as a unique authoring tool corresponding to the VW, the object may be used in another VW. For each avatar, a user may have a unique presentation in all VWs as in a real life. The user may change and upgrade the avatar, for example, "virtual himself or herself" in one VW so that all the updated properties are reflected in the other VWs. The avatar may include higher level semantic information as well as representation and animation features. Each VW may have an internal structure for handling the avatar. All characteristics associated with the avatar including an associated motion may be exported from a VW and then imported to another VW. Similarly, any virtual object created by a user may be exchangeable between VWs by exporting and importing the associated characteristics of the object. In a case of interfacing between the virtual world and the real world, sensed real world information may be processed to obtain meaningful data which may be used as a control parameter on the associated characteristics of the object in the VW. As for the avatar, a captured gesture of the user may be used to control a corresponding gesture of the avatar in the VW by updating the associated characteristics of the avatar. Similarly, an avatar motion created in the virtual world may be mapped onto a real robot for the use in, for example, dangerous areas, maintenance tasks, supports for disabled and elderly people.

There is a base type of attributes and characteristics of the virtual world objects which is shared by both avatars and virtual objects.

The base type of the virtual world object characteristics may include the following type of data:

vii) ID including a unique identifier for identifying individual virtual world object information.

The virtual world object base type may be inherited to both avatar metadata and virtual object metadata to extend the specific aspects of each item of metadata.

Virtual World Object Base Type

Figure 9:
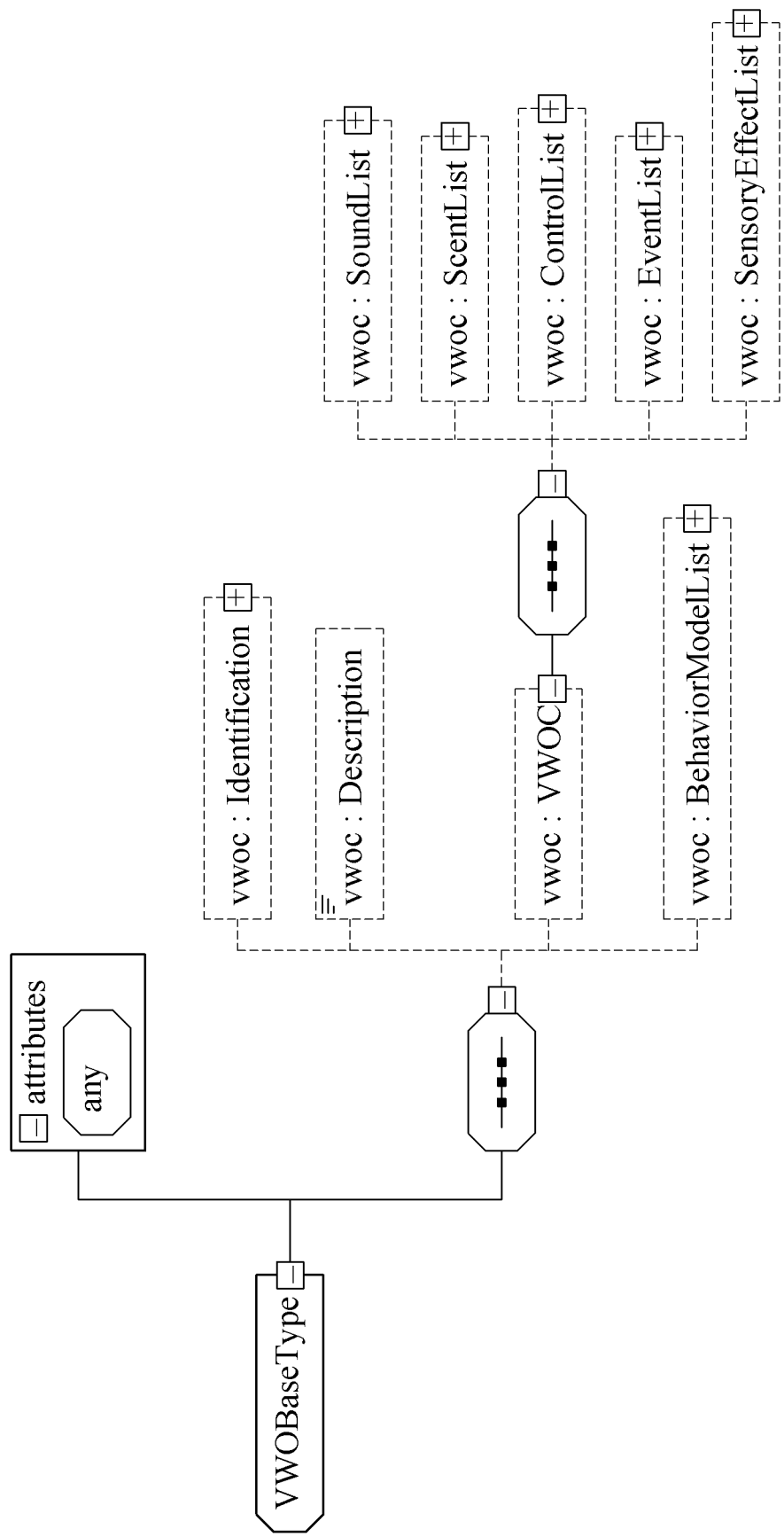
FIG. 9 is a diagram illustrating XML representation syntax according to an example embodiment.

A definition is made to a complex type of VWOBaseType, which may be inherited by avatar characteristic information and virtual object characteristic information. FIG. 9 is a diagram illustrating XML, representation syntax according to an example embodiment.

A source may be represented as shown in Table 8. Binary representation syntax may be represented as shown in Table 9. Also, semantics may be represented as shown in Table 10.

TABLE 8

```
Source    <complexType name="VWOBaseType" abstract="true">
            <complexContent>
              <restriction base="anyType">
              ... ..<sequence>
                <element name="Identification" type="vwoc:IdentificationType" minOccurs="0"/>
                <element.name="Description" type="string" minOccurs="0"/>
                <element name="VWOC" minOccurs="0">
                  <complexType>
                    <sequence>
                      <element name="SoundList" type="vwoc:VWOSoundListType" minOccurs="0"/>
                      <element name="ScentList" type="vwoc:VWOScentListType" minOccurs="0"/>
                      <element name="ControlList" type="vwoc:VWOControlListType" minOccurs="0"/>
                      <element name="EventList" type="vwoc:VWOEventListType" minOccurs="0"/>
                      <element name="SensoryEffectList" type="vwoc:VWOSensoryEffectType" minOccurs="0"/>
                    </sequence>
                  </complexType>
                </element>
                <element name="BehaviorModelList" type="vwoc:VWOBehaviorModelListType" minOccurs="0"/>
              ... .</sequence>
              ... .<attribute name="id" type="ID" use="optional"/>
              </restriction>
            </complexContent>
          </complexType>

<complexType name="AvatarBaseType" abstract="true">
            <complexContent>
              <extension base="vwoc:VWOBaseType"/>
            </complexContent>
          </complexType>

<complexType name="VirtualObjectBaseType" abstract="true">
            <complexContent>
              <extension base="vwoc:VWOBaseType"/>
            </complexContent>
          </complexType>
``` i) identity including identification descriptors;

ii) sound including sound resources and the related properties;

iii) scent including scent resources and the related properties;

iv) control including a set of descriptors for controlling motion features of an object such as translation, orientation and scaling;

v) event including a set of descriptors providing input events in a mouse, a keyboard and the like;

vi) behavior model including a set of descriptors defining behavior information of the object based on an input event; and

TABLE 9

| VWOBaseType{ | Number of bits | Mnemonic |
|---|---|---|
| IdentificationFlag | 1 | Bslbf |
| DescriptionFlag | 1 | Bslbf |
| VWOCFlag | 1 | Bslbf |
| BehaviorModelListFlag | 1 | bslbf |
| IdFlag | 1 | bslbf |
| if(IdentificationFlag) { | | |
| Identification | | IdentificationType |
| } | | |
| if(DescriptionFlag) { | | |
| Description | See ISO/ | UTF-8 |

TABLE 9-continued

| VWOBaseType{ | Number of bits | Mnemonic |
|---|---|---|
| | IEC10646[8] | |
| } | | |
| if(VWOCFlag) { | | |
|   SoundListFlag | 1 | bslbf |
|   ScentListFlag | 1 | bslbf |
|   ControlListFlag | 1 | bslbf |
|   EventListFlag | 1 | bslbf |
|   SensoryEffectListFlag | 1 | bslbf |
|   if(SoundListFlag) { | | |
|     SoundList | | VWOSoundListType |
|   } | | |
|   if(ScentListFlag) { | | |
|     ScentList | | VWOScentListType |
|   } | | |
|   if(ControlListFlag) { | | |
|     ControlList | | VWOControlListType |
|   } | | |
|   if(EventListFlag) { | | |
|     EventList | | VWOEventListType |
|   } | | |
|   If(SensoryEffectListFlag) { | | |
|     SensoryEffectList | | VWOSensoryEffectListType |
|   } | | |
| } | | |
| if(BehaviorModelListFlag) | | |
| { | | |
|   BehaviorModelList | | VWOBehaviorModelListType |
| } | | |
| if(IdFlag) { | | |
|   id | See ISO/ IEC10646[8] | UTF-8 |
| } | | |
| } | | |
| AvatarBaseType { | | |
|   VWOBase | | VWOBaseType |
| } | | |
| VirtualObjectBaseType { | | |
|   VWOBase | | VWOBaseType |
| } | | |

TABLE 10

| Name | Description |
|---|---|
| VWOBaseType | The base type describes common attributes and elements of an avatar and a virtual object. |
| DescriptionFlag | This field, represented in binary, signals a presence of a description element. "1" means that an element is used. "0" means that the element is not used. |
| VWOCFlag | This field, represented in binary, signals a presence of a VWOC element including sound, scent, and control and event lists. "1" means that an element is used. "0" means that the element is not used. |
| IdFlag | This field, represented in binary, signals a presence of an ID attribute. "1" means that an element is used. "0" means that the element is not used. |
| IdentificationFlag | This field, represented in binary, signals a presence of an identification element. "1" means that an element is used. "0" means that the element is not used. |
| SoundListFlag | This field, represented in binary, signals a presence of a sound element list. "1" means that an element is used. "0" means that the element is not used. |
| ScentListFlag | This field, represented in binary, signals a presence of a scent element list. "1" means that an element is used. "0" means that the element is not used. |
| ControlListFlag | This field, represented in binary, signals a presence of a control element list. "1" means that an element is used. "0" means that the element is not used. |
| EventListFlag | This field, represented in binary, signals a presence of an event element list. "1" means that an element is used. "0" means that the element is not used. |
| SensoryEffectListFlag | This field, represented in binary, signals a presence of a sensory effect element list. "1" means that an element is used. "0" means that the element is not used. |
| BehaviorModelListFlag | This field, represented in binary, signals a presence of a behavior model element list. "1" means that an element is used. "0" means that the element is not used. |
| Identification | An identification of a virtual world object |
| Description | A description of the virtual world object is included |
| VWOC | A set of characteristics of the virtual world object |
| SoundList | A list of sound effects associated with the virtual world object |
| ScentList | A list of scent effects associated with the virtual world object |
| ControlList | A list of controls associated with the virtual world object |
| EventList | A list of events connected with the virtual world object |
| SensoryEffectList | A list of sensory effects associated with the virtual world object |
| BehaviorModelList | A list of behavior models associated with the virtual world object |
| id | A unique identifier for identifying individual virtual world object information |
| AvatarBaseType | A type that provides a characteristic description of an individual avatar |
| VirtualObjectBaseType | A type that provides a characteristic description of an individual virtual object |

Identification Type

Figure 10:
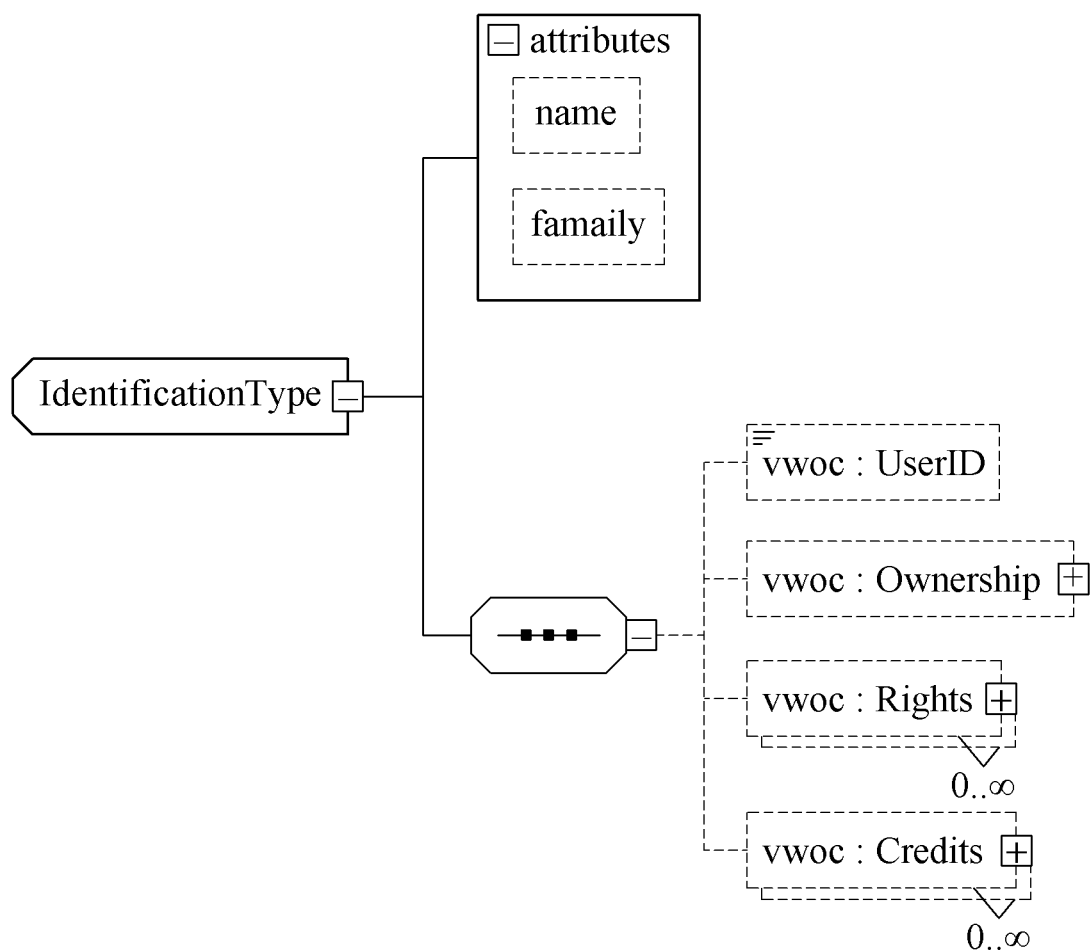
FIG. 10 is a diagram illustrating XML representation syntax associated with an identification type according to an example embodiment.

FIG. 10 is a diagram illustrating XML, representation syntax of an identification type according to an example embodiment.

A source may be represented as shown in Table 11. Binary representation syntax may be represented as shown in Table 12. Semantics may be represented as shown in Table 13.

TABLE 11

| Source | `<complexType name="IdentificationType">`<br>  `<sequence>`<br>    `<element name="UserID" type="anyURI" minOccurs="0"/>`<br>    `<element name="Ownership" type="mpeg7:AgentType" minOccurs="0"/>`<br>    `<element name="Right" type="r:License" minOccurs="0" maxOccurs="unbounded"/>`<br>    `<element name="Credits" type="mpeg7:AgentType" minOccurs="0" maxOccurs="unbounded"/>`<br>  `</sequence>`<br>  `<attribute name="name" type="string" use="optional"/>`<br>  `<attribute name="family" type="string" use="optional"/>`<br>`</complexType>` |
|---|---|

TABLE 12

| IdentificationType { | Number of bits | Mnemonic |
|---|---|---|
| UserIDFlag | 1 | bslbf |
| OwnershipFlag | 1 | bslbf |
| RightsFlag | 1 | bslbf |
| CreditsFlag | 1 | bslbf |
| nameFlag | 1 | bslbf |
| familyFlag | 1 | bslbf |
| if(UserIDFlag) { | | |
|   UserID | See ISO/IEC 10646[8] | UTF-8 |
| } | | |
| if(OwnershipFlag) { | | |
|   Ownership | | AgentType |
| } | | |
| if(RightsFlag) { | | |
|   NumRights | | vluimsbf5 |
|   for(k=0; k< NumRights; k++){ | | |
|     Rights[k] | See ISO/IEC 21000-16: 2005 | LicenseType |
|   } | | |
| } | | |
| if(CreditsFlag) { | | |
|   NumCredits | | vluimsbf5 |
|   for(k=0; k< NumCredits; k++){ | | |
|     Credits[k] | | AgentType |
|   } | | |
| } | | |
| if(nameFlag) { | | |
|   name | See ISO/IEC10646[8] | UTF-8 |
| } | | |
| if(familyFlag) { | | |
|   family | See ISO/IEC10646[8] | UTF-8 |
| } | | |
| AgentType{ | Number of bits | Mnemonic |
|   mpeg7:AgentType | | UTF-8 |
| } | | |
| LicenseType{ | Number of bits | Mnemonic |
|   r:LicenseType | | UTF-8 |
| } | | |

TABLE 13

| Name | Definition |
|---|---|
| IdentificationType | An identification of a virtual world object |
| UserIDFlag | This field, represented in binary, signals a presence of a UserID element. "1" means that an element is used. "0" means that the element is not used. |
| OwnershipFlag | This field, represented in binary, signals a presence of an ownership element. "1" means that an element is used. "0" means that the element is not used. |
| RightsFlag | This field, represented in binary, signals a presence of a rights element. "1" means that an element is used. "0" means that the element is not used. |
| CreditsFlag | This field, represented in binary, signals a presence of a credit element. "1" means that an element is used. "0" means that the element is not used. |
| nameFlag | This field, represented in binary, signals a presence of a name attribute. "1" means that an element is used. "0" means that the element is not used. |
| familyFlag | This field, represented in binary, signals a presence of a family attribute. "1" means that an element is used. "0" means that the element is not used. |
| UserID | A user ID connected with the virtual world object is included. |
| Ownership | In a binary representation, "AgentType" is encoded by UTF-8. |
| NumRights | This field, represented in binary, determines a number of items of rights information. |

TABLE 13-continued

| Name | Definition |
|---|---|
| Rights | In the binary representation, "LicenseType" is encoded by UTF-8. |
| NumCredits | This field, represented in binary, determines a number of items of credit information. |
| Credits | In the binary representation, "AgentType" is encoded by UTF-8. |
| name | A name of the virtual world object |
| family | Relationships with other virtual world objects |

VWO SoundListType

Figure 11:
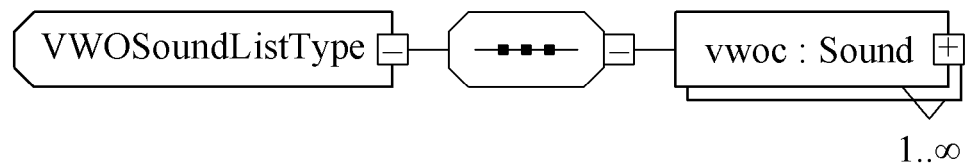
FIG. 11 is a diagram illustrating XML representation syntax associated with a virtual world object (VWO) sound list type according to an example embodiment.

FIG. 11 is a diagram illustrating XML, representation syntax of a VWO sound list type according to an example embodiment.

A source may be represented as shown in Table 14. Binary representation syntax may be represented as shown in Table 15. Semantics may be represented as shown in Table 16.

TABLE 14

Source   <complexType name="VWOSoundListType">
    <sequence>
     <element name="Sound" type="vwoc:VWOSoundType" maxOccurs="unbounded"/>
    </sequence>
   </complexType>

TABLE 15

| VWOSoundListType { | Number of bits | Mnemonic |
|---|---|---|
|  NumVWOSoundType | | vluimsbf5 |
|  for(k=0; k< NumVWOSoundType; k++){ | | |
|   Sound[k] | | VWOSoundType |
|  } | | |
| } | | |

TABLE 16

| Name | Definition |
|---|---|
| VWOSoundListType | A wrapper element type which allows multiple occurrences of sound effects associated with a virtual world object |
| NumVWOSoundType | This field, represented in binary, determines a number of items of sound information included in a sound list type. |
| Sound | A sound effect associated with the virtual world object |

VWOScentListType

Figure 12:
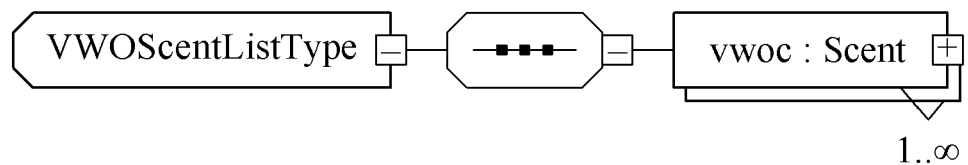
FIG. 12 is a diagram illustrating XML representation syntax associated with a VWO scent list type according to an example embodiment.

FIG. 12 is a diagram illustrating XML, representation syntax of a VWO scent list type according to an example embodiment.

A source may be represented as shown in Table 17. Binary representation syntax may be represented as shown in Table 18. Semantics may be represented as shown in Table 19.

TABLE 17

Source   <complexType name="VWOScentListType">
    <sequence>
     <element name="Scent" type=
     "vwoc:VWOScentType" maxOccurs=
     "unbounded"/>
    </sequence>
   </complexType>

TABLE 18

| VWOScentListType { | Number of bits | Mnemonic |
|---|---|---|
|  NumVWOScentType | | vluimsbf5 |
|  for(k=0; k< NumVWOScentType; k++){ | | |
|   Scent[k] | | VWOScentType |
|  } | | |
| } | | |

TABLE 19

| Name | Definition |
|---|---|
| VWOScentListType | A wrapper element type which allows multiple occurrences of scent effects associated with a virtual world object |
| NumVWOScentType | This field, represented in binary, determines a number of items of scent information included in a scent list type. |
| Scent | A scent effect associated with the virtual world object |

VWOControlListType

Figure 13:
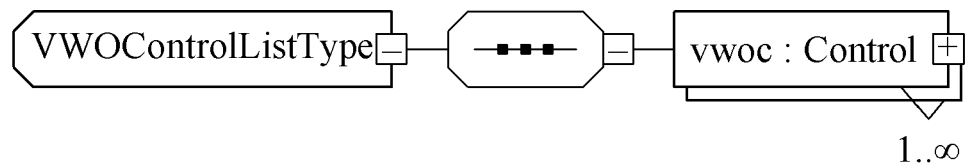
FIG. 13 is a diagram illustrating XML representation syntax associated with a VWO control list type according to an example embodiment.

FIG. 13 is a diagram illustrating XML representation syntax of a VWO control list type according to an example embodiment.

A source may be represented as shown in Table 20. Binary representation syntax may be represented as shown in Table 21. Semantics may be represented as shown in Table 22.

TABLE 20

Source   <complexType name="VWOControlListType">
    <sequence>
     <element name="Control" type=
     "vwoc:VWOControlType" maxOccurs=
     "unbounded"/>
    </sequence>
   </complexType>

TABLE 21

| VWOControlListType { | Number of bits | Mnemonic |
|---|---|---|
| NumVWOControlType<br>for(k=0; k< NumVWOControlType; k++){<br>   Control[k]<br>}<br>} | vluimsbf5 | VWOControl<br>Type |

TABLE 22

| Name | Definition |
|---|---|
| VWOControlListType | A wrapper element type which allows multiple occurrences of controls associated to a virtual world object |
| NumVWOControlType | This field, represented in binary, determines a number of items of control information included in a control list type. |
| Control | A control associated with the virtual world object |

VWOEventListType

Figure 14:
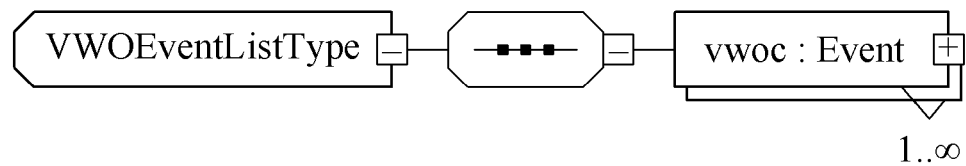
FIG. 14 is a diagram illustrating XML representation syntax associated with a VWO event list type according to an example embodiment.

FIG. 14 is a diagram illustrating XML representation syntax of a VWO event list type according to an example embodiment.

A source may be represented as shown in Table 23. Binary representation syntax may be represented as shown in Table 24. Semantics may be represented as shown in Table 25.

TABLE 23

| Source | <complexType-name="VWOEventListType"><br>   <sequence><br>      <element-name="Event"-type=<br>      "vwoc:VWOEventType"-<br>      maxOccurs="unbounded"/><br>   </sequence><br></complexType> |
|---|---|

TABLE 24

| VWOEventListType { | Number of bits | Mnemonic |
|---|---|---|
| NumVWOEventType<br>for(k=0; k< NumVWOEventType; k++){<br>   Event[k]<br>}<br>} | vluimsbf5 | VWOEventType |

TABLE 25

| Name | Definition |
|---|---|
| VWOEventListType | A wrapper element type which allows multiple occurrences of input events associated to a virtual world object |
| NumVWOEventType | This field, represented in binary, determines a number of items of event information included in an event list type. |
| Event | An input event associated with the virtual world object |

VWOBehaviorModelListType

Figure 15:
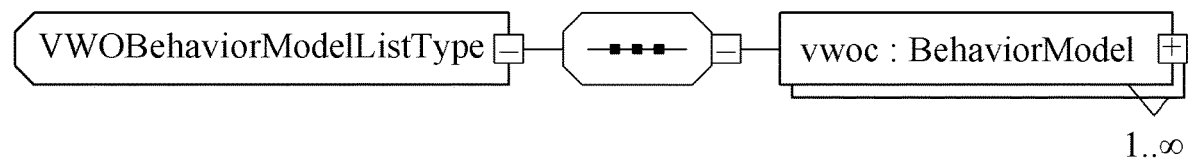
FIG. 15 is a diagram illustrating XML representation syntax associated with a VWO behavior model list type according to an example embodiment.

FIG. 15 is a diagram illustrating XML representation syntax of a VWO behavior model list type according to an example embodiment.

A source may be represented as shown in Table 26. Binary representation syntax may be represented as shown in Table 27. Semantics may be represented as shown in Table 28.

TABLE 26

| Source | <complexType-name="VWOBehaviorModelListType"><br>   <sequence><br>      <element-name="BehaviorModel"-type=<br>      "vwoc:VWOBehaviorModelType"-maxOccurs=<br>      "unbounded"/><br>   </sequence><br></complexType> |
|---|---|

TABLE 27

| VWOBehaviorModelListType { | Number of bits | Mnemonic |
|---|---|---|
| NumVWOBehaviorModelType<br>for(k=0;k<NumVWOBehaviorModelType; k++){<br>   BehaviorModel[k]<br>}<br>} | vluimsbf5 | VWOBehaviorModelType |

TABLE 28

| Name | Definition |
|---|---|
| VWOBehaviorModelListType | A wrapper element type which allows multiple occurrences of behavior models associated to a virtual world object |
| NumVWOBehaviorModelType | This field, represented in binary, determines a number of items of behavior model information included in a behavior model list type. |
| BehaviorModel | A behavior model associated with the virtual world object |

VWOSoundType

Figure 16:
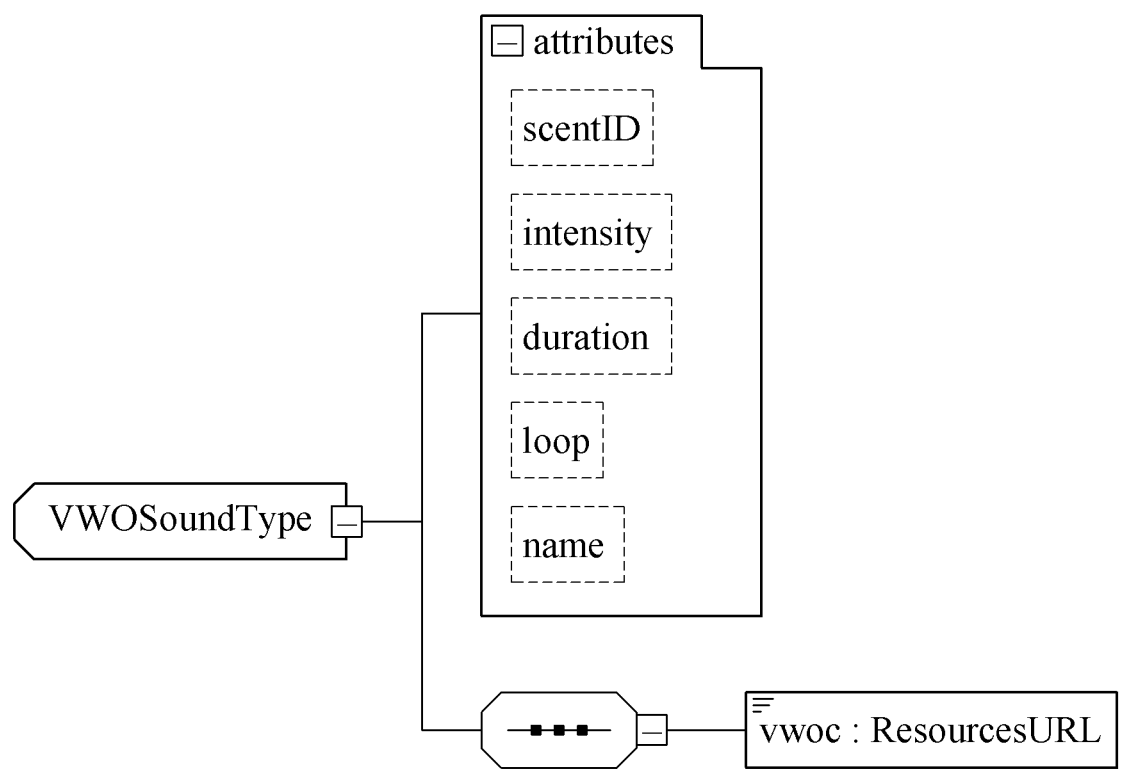
FIG. 16 is a diagram illustrating XML representation syntax associated with a VWO sound type according to an example embodiment.

FIG. 16 is a diagram illustrating XML representation syntax of a VWO sound type according to an example embodiment.

A source may be represented as shown in Table 29. Binary representation syntax may be represented as shown in Table 30. Semantics may be represented as shown in Table 31.

TABLE 29

| Source: | `<complexType-name="VWOSoundType">`<br>   `<sequence>`<br>      `<element-name="ResourcesURL"-type="anyURI"/>`<br>   `</sequence>`<br>   `<attribute-name="soundID"-type="ID"-use="optional">`<br>   `<attribute-name="intensity"-type="float"-use="optional"/>`<br>   `<attribute-name="duration"-type="unsignedint"-use="optional"/>`<br>   `<attribute-name="loop"-type="unsignedint"-use="optional"/>`<br>   `<attribute-name="name"-type="string"-use="optional"/>`<br>`</complexType>` |
|---|---|

TABLE 30

| VWOSoundType{ | Number of bits | Mnemonic |
|---|---|---|
| SoundIDFlag | 1 | bslbf |
| IntensityFlag | 1 | bslbf |
| DurationFlag | 1 | bslbf |
| LoopFlag | 1 | bslbf |
| NameFlag | 1 | bslbf |
| ResourcesURL | See ISO/IEC10646[8] | UTF-8 |
| if(SoundIDFlag) { | | |
| soundID | See ISO/IEC10646[8] | UTF-8 |
| } | | |
| if(IntensityFlag) { | | |
| intensity | 32 | fsbf |
| } | | |
| if(DurationFlag) { | | |
| duration | 32 | uimsbf |
| } | | |
| if(LoopFlag) { | | |
| loop | 8 | uimsbf |
| } | | |
| if(NameFlag) { | | |
| name | See ISO/IEC10646[8] | UTF-8 |
| } | | |
| } | | |

TABLE 31

| Name | Definition |
|---|---|
| VWOSoundType | A type including a description of a sound effect associated with a virtual world object |
| SoundIDFlag | This field, represented in binary, signals a presence of an ID attribute of a sound. "1" means that an attribute is used. "0" means that the attribute is not used. |
| IntensityFlag | This field, represented in binary, signals a presence of an intensity attribute. "1" means that an attribute is used. "0" means that the attribute is not used. |
| DurationFlag | This field, represented in binary, signals a presence of a duration attribute. "1" means that an attribute is used. "0" means that the attribute is not used. |
| LoopFlag | This field, represented in binary, signals a presence of a loop attribute. "1" means that an attribute is used. "0" means that the attribute is not used. |
| NameFlag | This field, represented in binary, signals a presence of a name attribute. "1" means that an attribute is used. "0" means that the attribute is not used. |
| SoundResources URL | An element including a link to a sound file, for example, an MPEG-4 (MP4) file |

TABLE 31-continued

| Name | Definition |
| --- | --- |
| soundID | A unique identifier of an object sound |
| intensity | A strength, for example, a volume of the sound |
| duration | A length of time in which the sound lasts in a default unit of millisecond (ms) |
| loop | A playback option for describing a number of repetitions (default value: 1, 0: indefinite repetition, 1: once, 2: twice, . . . , n: n times) |
| name | A name of the sound |

Table 32 shows a description of sound information associated with an object with the following semantics. A sound resource having a name of "BigAlarm" may be saved at "http://sounddb.com/alarmsound_0001.wav". An identifier of a value of soundID may be "SoundID3." The duration of the sound may be 30 seconds. The sound may be played at a volume of intensity="50%" repeatedly.

TABLE 32

```
<vwoc:Sound .loop="0" .soundID="SoundID3" .duration="30"
.intensity="0.5" . name="BigAlarm">
    <vwoc:ResourcesURL>http://sounddb.com/alarmsound_0001.wav
    </vwoc:ResourcesURL>
</vwoc:Sound>
```

VWOScentType

Figure 17:
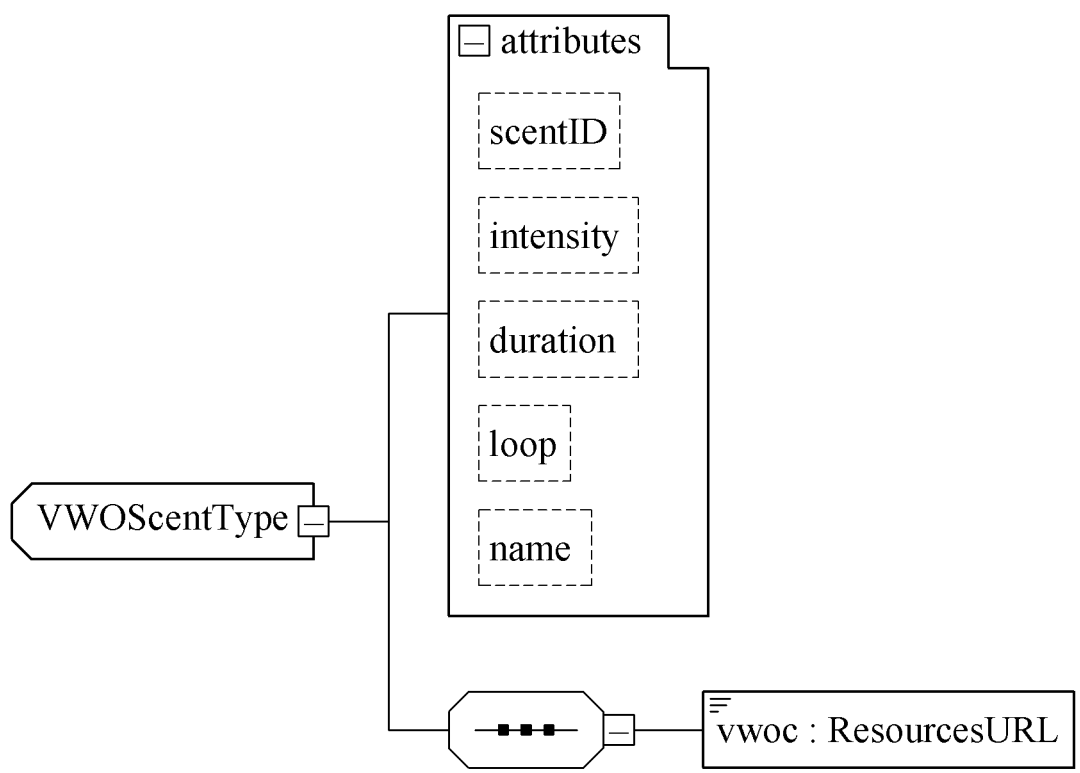
FIG. 17 is a diagram illustrating XML representation syntax associated with a VWO scent type according to an example embodiment.

FIG. 17 is a diagram illustrating XML, representation syntax of a VWO scent type according to an example embodiment.

A source may be represented as shown in Table 33. Binary representation syntax may be represented as shown in Table 34. Semantics may be represented as shown in Table 35.

TABLE 33

| | |
| --- | --- |
| ↓ | <complexType-name="VWOScentType"> |
| Source | <sequence> |
| | <element-name="ResourcesURL"-type="anyURI"/> |
| | </sequence> |
| | <attribute-name="scentID"-type="ID"-use="optional"/> |
| | <attribute-name="intensity"-type="float"-use="optional"/> |
| | <attribute-name="duration"-type="unsignedint"-use="optional"/> |
| | <attribute-name="loop"-type="unsignedint"-use="optional"/> |
| | <attribute-name="name"-type="string"-use="optional"/> |
| | </complexType> |

TABLE 34

| VWOScentType{ | Number of bits | Mnemonic |
| --- | --- | --- |
| ScentIDFlag | 1 | bslbf |
| IntensityFlag | 1 | bslbf |
| DurationFlag | 1 | bslbf |
| LoopFlag | 1 | bslbf |
| NameFlag | 1 | bslbf |
| ResourcesURL | See ISO/IEC10646[8] | UTF-8 |
| if(ScentIDFlag) { | | |
|    scentID | See ISO/IEC10646[8] | UTF-8 |
| } | | |
| if(IntensityFlag) { | | |
|    intensity | 32 | fsbf |
| } | | |
| if(DurationFlag) { | | |
|    duration | 32 | uimsbf |
| } | | |
| if(LoopFlag) { | | |
|    loop | 8 | uimsbf |
| } | | |
| if(NameFlag) { | | |
|    name | See ISO/IEC10646[8] | UTF-8 |
| } | | |
| } | | |

TABLE 35

| Name | Definition |
|---|---|
| VWOScentType | A type including a description of a scent effect associated with a virtual world object |
| ScentIDFlag | This field, represented in binary, signals a presence of an ID attribute of a scent. "1" means that an attribute is used. "0" means that the attribute is not used. |
| IntensityFlag | This field, represented in binary, signals a presence of an intensity attribute. "1" means that an attribute is used. "0" means that the attribute is not used. |
| DurationFlag | This field, represented in binary, signals a presence of a duration attribute. "1" means that an attribute is used. "0" means that the attribute is not used. |
| LoopFlag | This field, represented in binary, signals a presence of a loop attribute. "1" means that an attribute is used. "0" means that the attribute is not used. |
| NameFlag | This field, represented in binary, signals a presence of a name attribute. "1" means that an attribute is used. "0" means that the attribute is not used. |
| ScentResources URL | An element including a link to a scent file |
| scentID | A unique identifier of an object scent |
| intensity | A strength of the scent |
| duration | A length of time in which the scent lasts in a default unit of ms |
| loop | A playback option for describing the number of repetitions (default value: 1, 0: indefinite repetition, 1: once, 2: twice, . . . , n: n times) |
| name | A name of the scent |

Table 36 shows a description of scent information associated with an object with the following semantics. A scent resource having a name of "rose" may be saved at "http://scentdb.com/flower_0001.sct". An identifier of a value of scentID may be "ScentID5." The intensity of the scent may be 20% and the duration of the scent may be 20 seconds.

TABLE 36

```
<vwoc:Scent .duration="20" .intensity="0.2" .name="rose" .scentID="ScentID5">
    <vwoc:ResourcesURL>http://scentdb.com/flower_0001.sct</vwoc:ResourcesURL>
</vwoc:Scent>
```

VWOControlType

Figure 18:
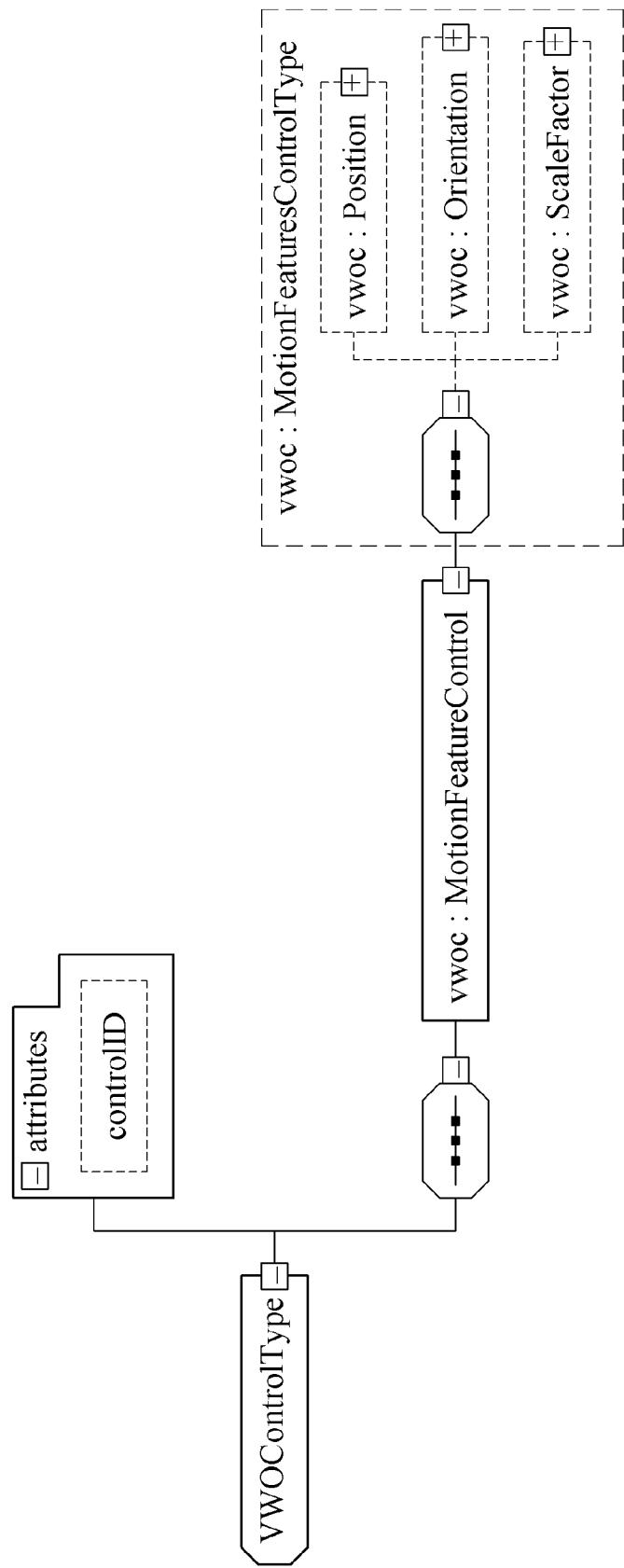
FIG. 18 is a diagram illustrating XML representation syntax associated with a VWO control type according to an example embodiment.

FIG. 18 is a diagram illustrating XML, representation syntax of a VWO control type according to an example embodiment.

A source may be represented as shown in Table 37. Binary representation syntax may be represented as shown in Table 38. Semantics may be represented as shown in Table 39.

TABLE 37

```
Source:  <complexType-name="VWOControlType">
             <sequence>
                 <element-name="MotionFeatureControl"-type="vwoc:MotionFeaturesControlType"/>
             </sequence>
             <attribute-name="controlID"-type="ID"-use="optional"/>
         </complexType>

<complexType-name="MotionFeaturesControlType">
             <sequence>
                 <element-name="Position"-type="mpegvct:Float3DVectorType"-minOccurs="0"/>
                 <element-name="Orientation"-type="mpegvct:Float3DVectorType"-minOccurs="0"/>
                 <element-name="ScaleFactor"-type="mpegvct:Float3DVectorType"-minOccurs="0"/>
             </sequence>
         </complexType>
```

TABLE 38

| VWOControlType { | Number of bits | Mnemonic |
|---|---|---|
| ControlIDFlag | 1 | bslbf |
| MotionFeatureControl | | MotionFeatureControlType |
| if(ControlIDFlag) { | | |
|   controlID | See ISO/IEC10646[8] | UTF-8 |
| } | | |
| } | | |
| MotionFeaturesControlType{ | | |

TABLE 38-continued

| VWOControlType { | Number of bits | Mnemonic |
|---|---|---|
| PositionFlag | 1 | bslbf |
| OrientationFlag | 1 | bslbf |
| ScaleFactorFlag | 1 | bslbf |
| if(PositionFlag) { | | |
|   Position | | Float3DVectorType |
| } | | |
| if(OrientationFlag) { | | |
|   Orientation | | Float3DVectorType |
| } | | |
| if(ScaleFactorFlag) { | | |
|   ScaleFactor | | Float3DVectorType |
| } | | |
| } | | |

TABLE 39

| Name | Definition |
|---|---|
| VWOControlType | A type including a description of a control associated with a virtual world object |
| ControlIDFlag | This field, represented in binary, signals a presence of a ControlID element. "1" means that an attribute is used. "0" means that the attribute is not used. |
| MotionFeatureControl | A set of elements controlling a position, an orientation, and a scale of the virtual world object<br><Element - Information><br>MotionFeatureControlType - A type that provides three types of controls such as a position control, an orientation control, and a scaling control<br>PositionFlag - This field, represented in binary, signals a presence of a position element. "1" means that an attribute is used. "0" means that the attribute is not used.<br>OrientationFlag - This field, represented in binary, signals a presence of an orientation element. "1" means that an attribute is used. "0" means that the attribute is not used.<br>ScaleFactorFlag - This field, represented in binary, signals a presence of a scale factor element. "1" means that an attribute is used. "0" means that the attribute is not used.<br>Position - A position of the object in a scene based on a 3D floating point vector (x, y, z)<br>Orientation - An orientation of the object in the scene based on a 3D floating point vector as an Euler angle (yaw, pitch, roll)<br>ScaleFactor - A scale of the object in the scene is expressed based on a 3D floating point vector (Sx, Sy, Sz). |
| controlID | A unique identifier of the control |

When two controllers are associated with the same object but on different parts of the object, and when the parts are in a hierarchical structure, for example, a relationship of parent and children, the controllers may perform a relative motion of the children. When the controllers are associated with the same part, the controller may perform scaling or apply similar effects on the entire object.

Table 40 shows a description of object control information with the following semantics. A motion feature control for changing a position may be given and an identifier of controlID may be "CtrlID7." The object is located at X="122.0", Y="150.0", and Z="40.0".

TABLE 40

```
<vwoc:Control .controlID="CtrlID7">
  <vwoc:MotionFeatureControl>
    <vwoc:Position>
      <mpegvct:X>122.0</mpegvct:X>
```

TABLE 40-continued

```
      <mpegvct:Y>150.0</mpegvct:Y>
      <mpegvct:Z>40.0</mpegvct:Z>
    </vwoc:Position>
  </vwoc:MotionFeatureControl>
</vwoc:Control>
```

VWOEventType

Figure 19:
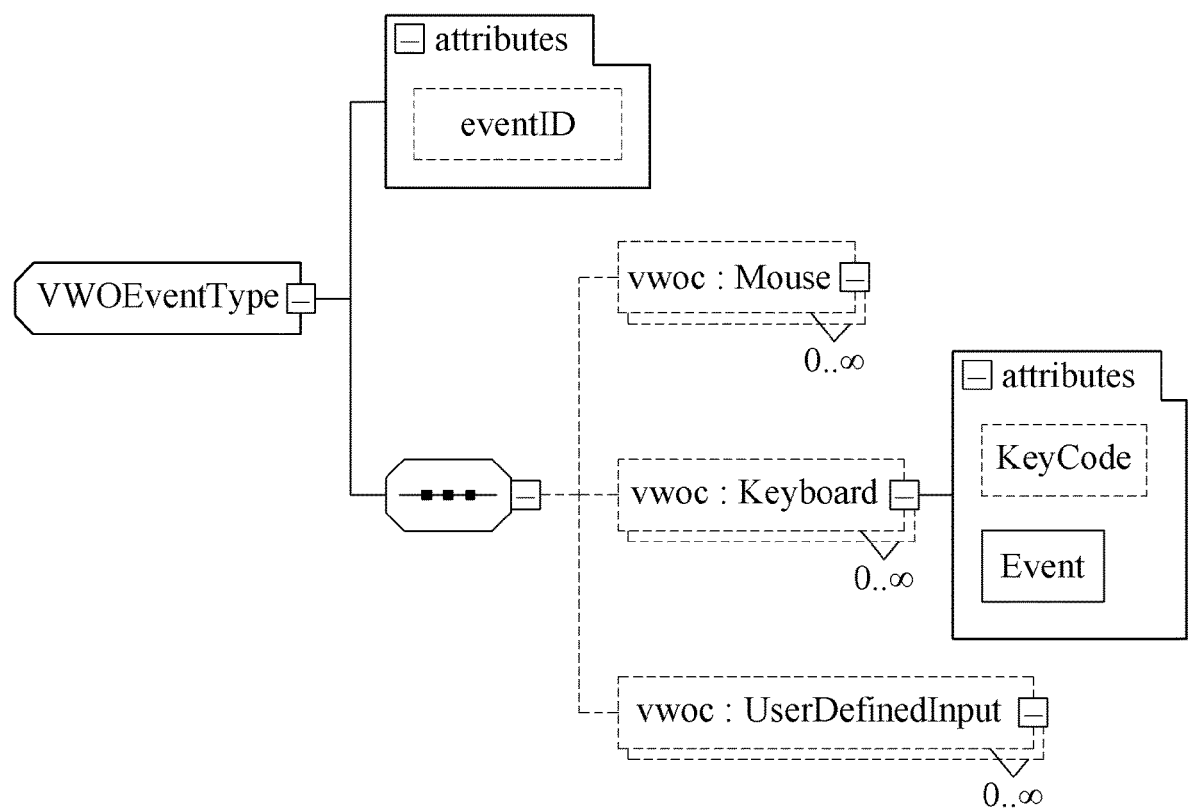
FIG. 19 is a diagram illustrating XML representation syntax associated with a VWO event type according to an example embodiment.

FIG. 19 is a diagram illustrating XML representation syntax of a VWO event type according to an example embodiment.

A source may be represented as shown in Table 41. Binary representation syntax may be represented as shown in Table 42. Semantics may be represented as shown in Table 43.

TABLE 41

| |
|---|
| Source    <complexType-name="VWOEventType">↵<br>        <sequence>↵<br>           <element-name="Mouse" type="mpeg7:termReferenceType" minOccurs="0" maxOccurs="unbounded"/>↵<br>           <element-name="Keyboard" minOccurs="0" maxOccurs="unbounded"/>↵<br>               .<complexType>↵<br>                  <attribute-name="keyCode" type="mpeg7:unsigned8" use="optional"/>↵<br>                  <attribute-name="event" use="required">↵<br>                    <simpleType>↵<br>                      <restriction-base=="string">↵<br>                        <enumeration-value="pressed"/>↵<br>                          <enumeration-value="clicked"/>↵<br>                          <enumeration-value="released"/>↵<br>                      <restriction>↵<br>                  <simpleType>↵<br>                <attribute>↵<br>            <complexType>↵<br>        </element>↵<br>        <element-name="UserDefinedInput" type="string"minOccurs="0"maxOccurs="unbounded"/>↵<br>        <sequence>↵<br>        <attribute-name="eventID"type="ID" use="required"/>↵<br>    <complexType>↵ |

TABLE 42

| VWOEventType { | Number of bits | Mnemonic |
|---|---|---|
|   MouseFlag | 1 | bslbf |
|   KeyboardFlag | 1 | bslbf |
|   UserDefinedInputFlag | 1 | bslbf |
|   if(MouseFlag) { | | |
|   NumOfMouse | | vluimsbf5 |
|   for (k=0; k<NumOfMouse; k++) { | | |
|   Mouse[k] | | MouseEventCS |
|   } | | |
|   } | | |
|   if(KeyboardFlag) { | | |
|   NumOfKeyboard | | vluimsbf5 |
|   for(k=0; k< NumOfKeyboard; k++ ) { | | |
|   keyCodeFlag[k] | 1 | bslbf |
|   if(keyCodeFlag[k]) { | | |
|   keyCode | 8 | uimsbf |
|   } | | |
|   event[k] | 2 | bslbf |
|   } | | |
|   } | | |
|   if(UserDefinedInputFlag) { | | |
|   NumOfUserDefinedInput | | vluimsbf5 |
|   for(k=0; k<NumOfUserDefinedInput; k++ ) { | | |
|   UserDefinedInput[k] | See ISO/IEC10646[8] | UTF-8 |
|   } | | |
|   } | | |
|   eventID | See ISO/IEC10646[8] | UTF-8 |
| } | | |

TABLE 43

| Name | Definition |
|---|---|
| VWOEventType | A type including a description of an input event associated with a virtual world object |
| MouseFlag | This field, represented in binary, signals a presence of a mouse element. "1" means that an element is used. "0" means that the element is not used. |
| KeyboardFlag | This field, represented in binary, signals a presence of a keyboard element. "1" means that an element is used. "0" means that the element is not used. |
| UserDefinedInputFlag | This field, represented in binary, signals a presence of a UserDefinedInput element. "1" means that an element is used. "0" means that the element is not used. |
| NumOfMouse | This field, represented in binary, determines a number of mouse events included in VWOEventType. |

TABLE 43-continued

| Name | Definition |
|---|---|
| Mouse | <Name - Element(4 bits) - Description><br>Click - 0000 - An event of clicking a left button of a mouse<br>Doubleclick - 0001 - An event of double-clicking the left button of the mouse<br>leftBtnDown - 0010 - An event occurring while the left button of the mouse is held down<br>leftBtnUp - 0011 - An event occurring when the left button of the mouse is released<br>rightBtnDown - 0100 - An event occurring while a right button of the mouse is held down<br>rightBtnUp - 0101 - An event occurring when the right button of the mouse is released<br>move - 0110 - An event occurring while a mouse position is moved<br>( ) - 0111~1111 - Reserved |
| NumOfKeyboard | This field, represented in binary, determines a number of keyboard events included in VWOEventType. |
| keyCodeFlag | This field, represented in binary, signals a presence of a keycode input element. "1" means that an element is used. "0" means that the element is not used. |
| keyCode | A key code (0-255) corresponding to each key |
| event | A keyboard event (, for example, pressed, clicked, or released)<br>In binary, the keyboard event is represented as follows: pressed = 00; clicked = 01; released = 10; and reserved = 11. |
| NumOfUserDefinedInput | This field, represented in binary, determines a number of user-defined input events included in VWOEventType. |
| UserDefinedInput | An input event defined by a user |
| eventID | A unique identifier of the event |

Table 44 shows a description of an input event with the following semantics. The mouse corresponding to an input device may generate an input value "click." A value of eventID for identifying the input may be "EventID1."

TABLE 44

```
<vwoc:Event .eventID="EventID1">
    <vwoc:Mouse>urn:mpeg:mpeg-v:01-VWOC-MouseEventCS-NS:
click</vwoc:Mouse>
</vwsoc:Event>
```

Table 45 shows a description of an input event with the following semantics. The keyboard corresponding to the input device may generate an input value for pressing a key code "65." A value of eventID for identifying the input may be "EventID2".

TABLE 45

```
<vwoc:Event .eventID="EventID2">
    <vwoc:Keyboard .keyCode="65" .event="pressed"/>
</vwoc:Event>
```

Table 46 shows a description of an input event with the following semantics. The keyboard may generate an input event for pressing two keys "shift"+ "a". The keyboard event may include a "pressed" event of the "shift" key having the key code "16" and a "pressed" event of the "a" key having the key code "65". A value of eventID for identifying the input may be "EventID3".

TABLE 46

```
<vwoc:Event .eventID="EventID3">
    <vwoc:Keyboard .keyCode="16" .event="pressed"/>
    <vwoc:Keyboard .keyCode="65" .event="pressed"/>
</vwoc:Event>
```

VWOSensoryEffectType

Figure 20:
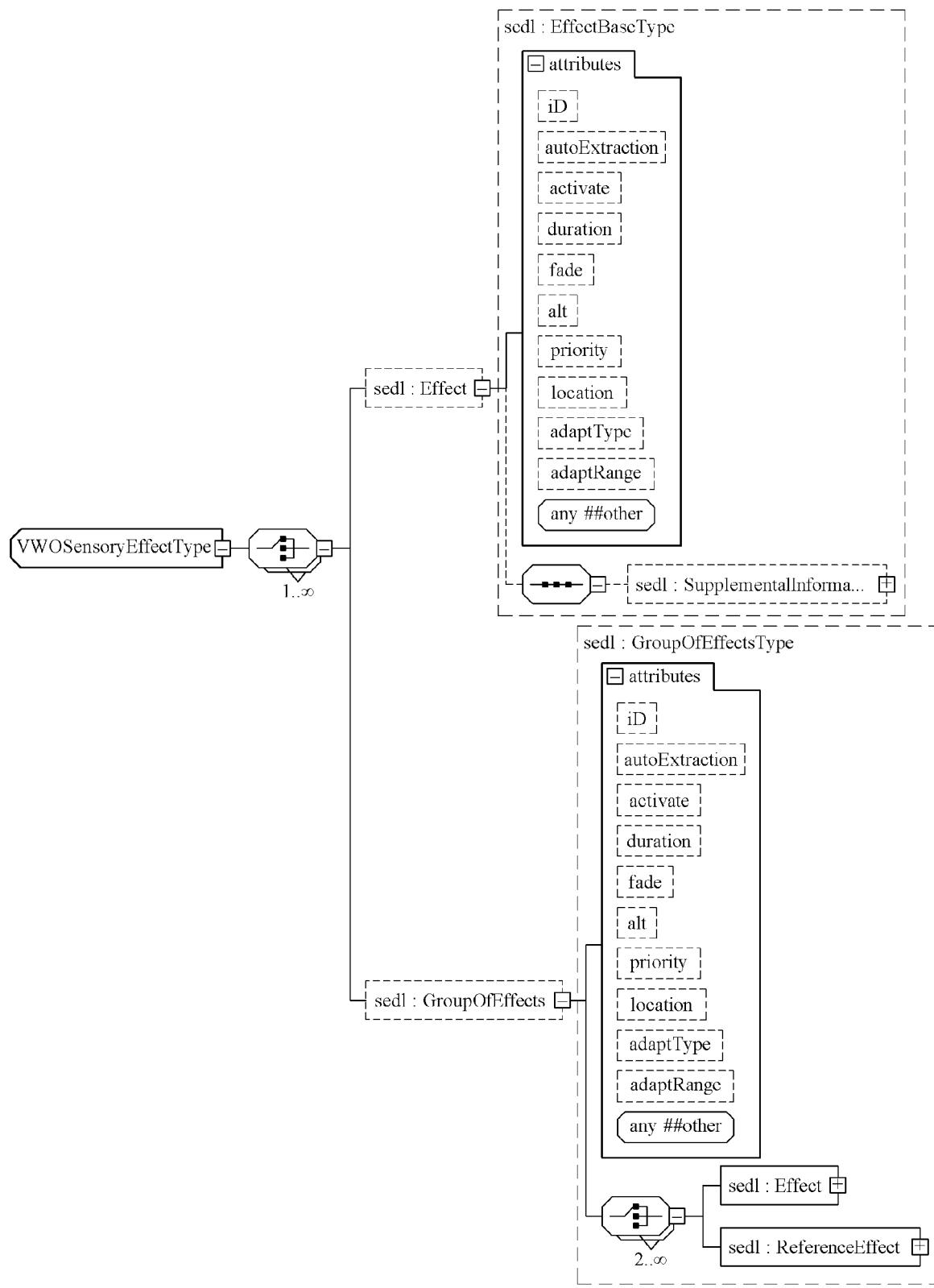
FIG. 20 is a diagram illustrating XML representation syntax associated with a VWO sensory effect type according to an example embodiment.

FIG. 20 is a diagram illustrating XML, representation syntax of a VWO sensory effect type according to an example embodiment.

A source may be represented as shown in Table 47. Binary representation syntax may be represented as shown in Table 48. Semantics may be represented as shown in Table 49.

TABLE 47

| Source | <complexType-name="VWOSensoryEffectType"><br>    <choice-maxOccurs="unbounded"><br>        element-ref="sedl-Effect"/><br>        element-ref="sedl-GroupOfEffects"/><br>    </choice><br><complexType> |
|---|---|

TABLE 48

| VWOSensoryEffectType { | Number of bits | Mnemonic |
|---|---|---|
| EffectFlag | 1 | bslbf |
| GroupOfEffectsFlag | 1 | bslbf |
| If(EffectFlag) { | | |
| EffectBaseType | | EffectBaseType |
| } | | |
| If(GroupOfEffectsFlag) { | | |
| GroupOfEffectsType | | GroupOfEffectType |
| } | | |
| } | | |

TABLE 49

| Name | Definition |
|---|---|
| VWOSensoryEffectType | A type including a description of a sensory effect associated with a virtual world object |
| EffectFlag | This field, represented in binary, signals a presence of an effect element. "1" means that an element is used. "0" means that the element is not used. |
| GroupOfEffectsFlag | This field, represented in binary, signals a presence of a GroupOfEffect element. "1" means that an element is used. "0" means that the element is not used. |
| Effect | A sensory effect |
| GroupOfEffects | A group of sensory effects Grouping is performed to remove redundancy from child elements. All attributes included the group are inherited to the child elements. |

Table 50 shows a description of a VWO sensory effect list with the following semantics.

TABLE 50

```
<vwoc:SensoryEffectList>
    <sedl:Effect .xsi:type="sev:LightType" .duration="5" .activate=
"true">
    </sedl:Effect>
</vwoc:SensoryEffectList>
```

VWOBehaviorModelType

Figure 21:
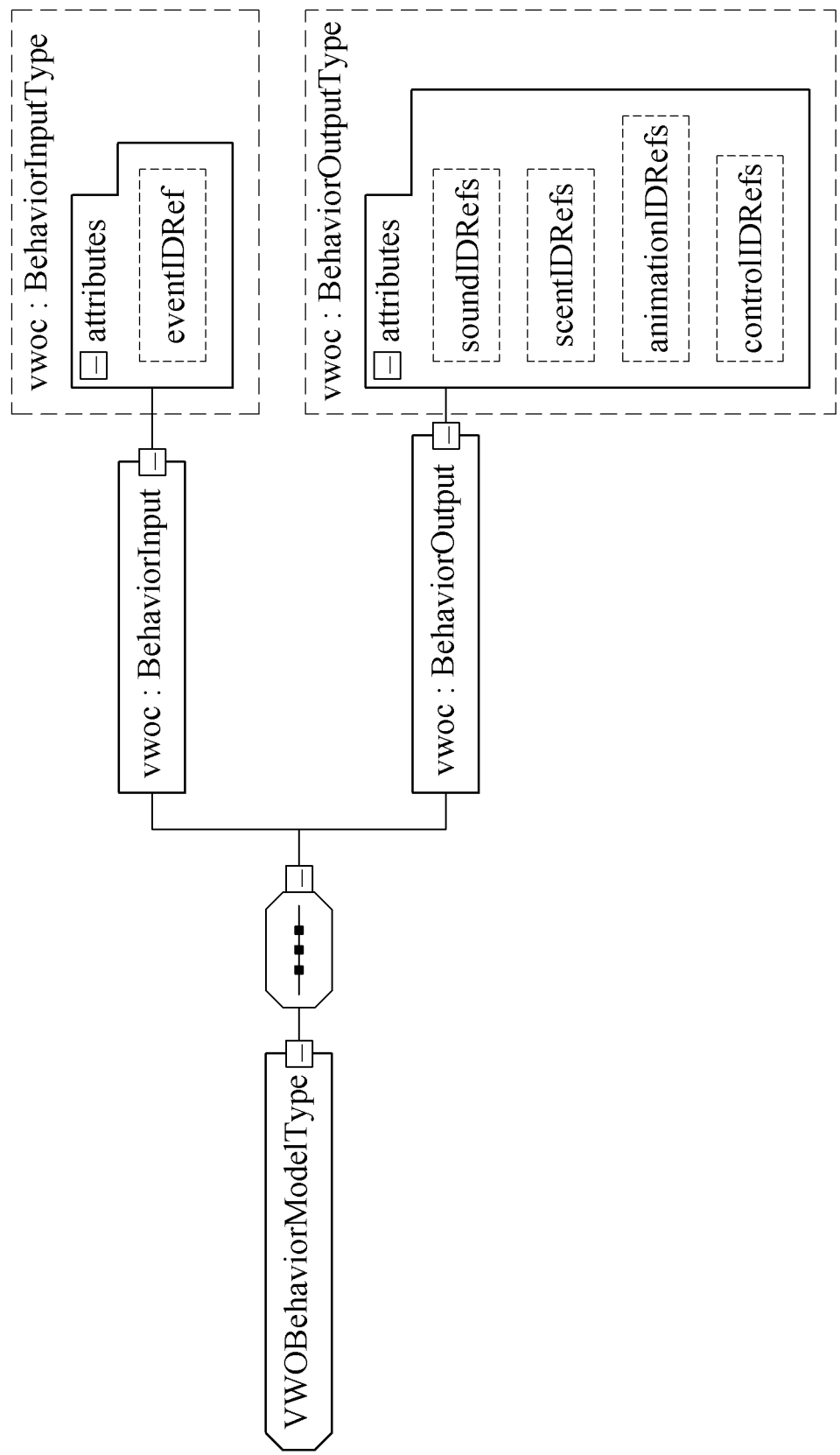
FIG. 21 is a diagram illustrating XML representation syntax associated with a VWO behavior model type according to an example embodiment.

FIG. 21 is a diagram illustrating XML representation syntax of a VWO behavior model type according to an example embodiment.

A source may be represented as shown in Table 51. Binary representation syntax may be represented as shown in Table 52. Semantics may be represented as shown in Table 53.

TABLE 51

| Source | `<complexType-name="VWOBehaviorModelType">`<br>  `<sequence>`<br>    `<element-name="BehaviorInput"-type="vwoc:BehaviorInputType"/>`<br>    `<element-name="BehaviorOutput"-type="vwoc:BehaviorOutputType"/>`<br>  `<sequence>`<br>`<complexType>`<br>`<complexType-name="BehaviorInputType"/>`<br>  `<attribute-name="eventIDRef"-type="IDREF"/>`<br>`<complexType>`<br><br>`<complexType-name="BehaviorOutputType"/>`<br>  `<attribute-name="soundIDRefs"-type="IDREFS" use="optional"/>`<br>  `<attribute-name="scentIDRefs"-type="IDREFS"-use="optional"/>`<br>  `<attribute-name="animationaIDRefs"-type="IDREFS"-use="optional"/>`<br>  `<attribute-name="controlIDRefs"-type="IDREFS"-use="optional"/>`<br>`<complexType>` |
|---|---|

TABLE 52

| VWOBehaviorModelType{ | Number of bits | Mnemonic |
|---|---|---|
| BehaviorInput |  | BehaviorInputType |
| BehaviorOutput |  | BehaviorOutputType |
| } |  |  |
| BehaviorInputType{ |  |  |
|   EventIDRefFlag | 1 | bslbf |
|   if(EventIDRefFlag){ |  |  |
|     eventIDRef | See ISO/IEC10646[8] | UTF-8 |
|   } |  |  |
| } |  |  |
| BehaviorOutputType{ |  |  |
|   SoundIDFlag | 1 | bslbf |
|   ScentIDFlag | 1 | bslbf |
|   AnimationIDFlag | 1 | bslbf |
|   ControlIDFlag | 1 | bslbf |
|   if(SoundIDFlag) { |  |  |
|     SoundIDRefs | See ISO/IEC10646[8] | UTF-8 |
|   } |  |  |
|   if(ScentIDFlag) { |  |  |
|     ScentIDRefs | See ISO/IEC10646[8] | UTF-8 |
|   } |  |  |
|   if(AnimationIDFlag) { |  |  |
|     AnimationIDRefs | See ISO/IEC10646[8] | UTF-8 |
|   } |  |  |
|   if(ControlIDFlag) { |  |  |
|     ControlIDRefs | See ISO/IEC10646[8] | UTF-8 |
|   } |  |  |
| } |  |  |

TABLE 53

| Name | Description |
|---|---|
| VWOBehaviorModelType | A type describing a container of an input event and an associated output object behavior |
| BehaviorInput | An input event for making an object behavior |
| BehaviorInputType | Reference is made to an input event ID.<br><Element - Information><br>eventIDRef - An input event ID<br>EventIDRef Flag - This field, represented in binary, signals a presence of an eventIDRef element. "1" means that an element is used. "0" means that the element is not used. |
| BehaviorOutput | An object behavior output corresponding to the input event |
| BehaviorOutputType | Reference is made to a list of object behavior outputs.<br><Element - Information><br>SoundFlag - This field, represented in binary, signals a presence of a sound element. "1" means that an element is used. "0" means that the element is not used.<br>ScentFlag - This field, represented in binary, signals a presence of a scent element. "1" means that an element is used. "0" means that the element is not used.<br>AnimationFlag - This field, represented in binary, signals a presence of an animation element. "1" means that an element is used. "0" means that the element is not used.<br>ControlFlag - This field, represented in binary, signals a presence of a control element. "1" means that an element is used. "0" means that the element is not used.<br>soundIDRefs - A sound effect of an object is provided by referring to soundID.<br>scentIDRefs - A scent effect of the object is provided by referring to scentID.<br>animationIDRefs - An animation clip of the object is provided by referring to animationID.<br>controlIDRefs - A control of the object is provided by referring to ControlID. |

Table 54 shows a description of a VWO behavior model with the following semantics. When eventID="EventID1" is given as BehaviorInput, BehaviorOutput may be executed in association with soundID="SoID5" and animationID="AniID4."

TABLE 54

```
<vwoc:BehaviorModel>
    <vwoc:BehaviorInput .eventIDRef="EventID1"/>
    <vwoc:BehaviorOutput .animationIDRefs="AniID4"
        .soundIDRefs="SoID5"/>
</vwoc:BehaviorModel>
```

Light Effect

Syntax of a light effect may be represented as shown in Table 55. Binary representation syntax may be represented as shown in Table 56. Semantics may be represented as shown in Table 57.

TABLE 55

```
<complexType name="LightType">
    <complexContent>
        <extension base="sedl:EffectBaseType">
            <attribute name="color" type="ct:colorType" use="optional"/>
            <attribute name="intensity-value" type="sedl:intensityValueType"
                use="optional"/>
            <attribute name="intensity-range" type="sedl:intensityRangeType"
                use="optional"/>
        </extension>
```

TABLE 55-continued

```
    </complexContent>
</complexType>
```

TABLE 56

| LightType { | Number of bits | Mnemonic |
|---|---|---|
| EffectBaseType | | EffectBaseType |
| colorFlag | 1 | bslbf |
| intensityValueFlag | 1 | bslbf |
| intensityRangeFlag | 1 | bslbf |
| if(colorFlag) { | | |
|   color | | colorType |
| } | | |
| if(intensityValueFlag) { | | |
|   intensity-value | 32 | fsfb |
| } | | |
| if(intensityRangeFlag) { | | |
|   intensity-range[0] | 32 | fsfb |
|   intensity-range[1] | 32 | fsfb |
| } | | |
| } | | |

TABLE 57

| Name | Definition |
| --- | --- |
| LightType | A tool for describing a light effect |
| colorFlag | This field, represented in binary, signals a presence of a color attribute. "1" means that the color attribute is present; otherwise, the color attribute is absent. |
| intensityValueFlag | This field, represented in binary, signals a presence of an intensity-value attribute. "1" means that the intensity-value attribute is present; otherwise, the intensity-value attribute is absent. |
| intensityRangeFlag | This field, represented in binary, signals a presence of an intensity-range attribute. "1" means that the intensity-range attribute is present; otherwise, the intensity-value attribute is absent. |
| color | For example, "urn:mpeg:mpeg-v:01-SI-ColorCS-NS:alice_blue" describes an Alice blue color. |
| intensity-value | An intensity of light effect described based on illumination in lux. |
| intensity-range | A range of intensity value, for example, [$10.0^{-5}$ lux, 130.0 klx] |

Table 58 shows a description of a light effect with the following semantics. An intensity may be 50,0 lux within a range of ($10^{-5}$,32000) lux, for example, an illumination of a family living room, with the color #FF0000. The light effect may be activated at si:pts="0" and deactivated at si:pts="28."

TABLE 58

```
<sedl:Effect .xsi:type="sev:LightType" .intensity-value="50.0"
.intensity-range="0.00001 .32000.0" .activate="true" .color=
"#FF0000" .si:pts="0"/>
. . .
<sedl:Effect .xsi:type="sev:LightType" .activate="false" .color=
"#FF0000" . si:pts="28"/>
```

Table 59 shows a description of a light effect that uses a color scheme in which colors are defined as a reference to a color classification scheme.

TABLE 59

```
<sedl:DescriptionMetadata>
.<sedl:ClassificationSchemeAlias .href="urn:mpeg:mpeg-v:01-SI-
ColorCS-NS" . alias="COLOR"/>
</sedl:DescriptionMetadata>
<sedl:Effect .xsi:type="sev:LightType" .intensity-value="50.0"
.intensity-range="0.00001 .32000.0" .duration="28" .color=":
COLOR:amber" .si:pts="0"/>
```

Table 59 shows a description of a light effect that deactivates a light effect of "left:middle:front."

TABLE 60

```
<sedl:DescriptionMetadata>
.<sedl:ClassificationSchemeAlias .href="urn:mpeg:mpeg-v:(01-SI-
LocationCS-NS" . alias="WCS"/>
</sedl:DescriptionMetadata>
<sedl:Effect .xsi:type="sev:LightType" .location=":WCS:left:middle:
front" . activate="false" .si:pts="40" .fade="1"/>
```

Scent Effect

Syntax of a scent effect may be represented as shown in Table 61. Binary representation syntax may be represented as shown in Table 62. Semantics may be represented as shown in Table 63.

TABLE 61

```
<complexType name="ScentType">
  <complexContent>
    <extension base="sedl:EffectBaseType">
      <attribute name="scent" type="mpeg7:termReferenceType"
        use="optional"/>
      <attribute name="intensity-value" type="sedl:intensityValueType"
        use="optional"/>
      <attribute name="intensity-range" type="sedl:intensityRangeType"
        use="optional"/>
    </extension>
  </complexContent>
</complexType>
```

TABLE 62

| ScentType { | Number of bits | Mnemonic |
| --- | --- | --- |
| EffectBaseType |  | EffectBaseType |
| scentFlag | 1 | bslbf |
| intensityValueFlag | 1 | bslbf |
| intensityRangeFlag | 1 | bslbf |
| if(scentFlag) { |  |  |
| scent | 9 | bslbf |
| } |  |  |
| if(intensityValueFlag) { |  |  |
| intensity-value | 32 | fsfb |
| } |  |  |
| if(intensityRangeFlag) { |  |  |
| intensity-range[0] | 32 | fsfb |
| intensity-range[1] | 32 | fsfb |
| } |  |  |
| } |  |  |

TABLE 63

| Name | Definition |
| --- | --- |
| ScentType | A tool for describing a scent effect Scent |
| scentFlag | This field, represented in binary, signals a presence of a scent attribute. "1" means that the scent attribute is present; otherwise, the scent attribute is absent. |
| intensityValueFlag | This field, represented in binary, signals a presence of an intensity-value attribute. "1" means that the intensity-value attribute is present; otherwise, the intensity-value attribute is absent. |

TABLE 63-continued

| Name | Definition |
| --- | --- |
| intensityRangeFlag | This field, represented in binary, signals a presence of an intensity-range attribute. "1" means that the intensity-range attribute is present; otherwise, the intensity-value attribute is absent. |
| scent | Describing whether to use a scent |
| intensity-value | An intensity of scent effect represented in milliliter per hour (ml/h) |
| intensity-range | A range of intensity value, for example, [0.0, 10.0] ml/h. |

Table 64 shows a description of a scent effect with the following semantics. A scent may be lilac in accordance with a classification scheme, an intensity may be 0.1 ml/h within a range of (0.0,10.0) ml/h for ten seconds, and the scent effect may start at si:pts="0."

TABLE 64

```
<sedl:DescriptionMetadata>
  <sedl:ClassificationSchemeAlias .alias="SCENT" .href="urn:mpeg:
mgeg-v:01-SI-ScentCS-NS"/>
</sedl:DescriptionMetadata>
<sedl:Effect .xsi:type="sev:ScentType" .intensity-value="0.1"
.intensity-range="0.0 . 10.0" .duration="10" .scent=":SCENT:
lilac" .si:pts="0"/>
```

Arrayed Light Effect

Syntax of an arrayed light effect may be represented as shown in Table 65. Binary representation syntax may be represented as shown in Table 66. Semantics may be represented as shown in Table 67.

TABLE 65

```
<!-- ################################################## -->
<!-- SEV Arrayed Light type -->
<!-- ################################################## -->
```

TABLE 65-continued

```
<complexType name="ArrayedLightType">
  <complexContent>
    <extension base="sedl:EffectBaseType">
      <sequence>
        <choice>
          <element name="LightSamples" type="sev:
            colorMatrixType"/>
          <element name="LightResource" type="sev:
            LightResourceType"/>
        </choice>
      </sequence>
      <attribute name="updateRate" type="positiveInteger" use=
        "optional"/>
    </extension>
  </complexContent>
</complexType>
<complexType name="colorMatrixType">
  <simpleContent>
    <extension base="sev:colorVector">
      <attribute ref="mpeg7:dim" use="required"/>
    </extension>
  </simpleContent>
</complexType>
<simpleType name="colorVector">
  <list itemType="ct:colorType"/>
</simpleType>
<complexType name="LightResourceType">
  <attribute name="type" type="string" use="required"/>
  <attribute name="ref" type="anyURI" use="required"/>
</complexType>
```

TABLE 66

| | Number of bits | Mnemonic |
| --- | --- | --- |
| ArrayedLightType { | | |
| | | |
| EffectBaseType | | EffectBaseType |
| LightSamplesFlag | 1 | bsblf |
| updateRateFlag | 1 | bslbf |
| if(LightSamplesFlag) { | | |
|   NbrOfLightSampleMatrix | 16 | uimsbf |
|   SizeOfLightSamplesRow | 16 | uimsbf |
|   SizeOfLightSamplesColumn | 16 | uimsbf |
|   for(j=0;j<NbrOfLightSampleMatrix;j++) { | | |
|     for(k=0;k<( SizeOfLightSamplesRow * SizeOfLightSamplesColumn);k++) { | | |
|       LightSamples[k] | | ColorType |
|     } | | |
|   } | | |
| } | | |
| else { | | |
|   NbrOfLightResources | 16 | uimsbf |
|   for(k=0;k< NbrOfLightResources;k++) { | | |
|     LightResource | | LightResourceType |
|   } | | |
| } | | |
| If(updateRateFlag) { | | |
|   updateRate | 16 | uimsbf |
| } | | |
| } | | |

TABLE 66-continued

| | Number of bits | Mnemonic |
|---|---|---|
| LightResourceType { | | |
|   typeLength | | vluimsbf5 |
|   Type | typeLength *8 | Bslbf |
|   Ref | See ISO/IEC 10646[8] | UTF-8 |
| } | | |

TABLE 67

| Name | Definition |
|---|---|
| ArrayedLightType | A tool for describing an arrayed light effect The arrayed light effect is effectively represented by LightSamples or LightResources. LightResources includes an m × n color matrix mapped to a light display actuator such as a light emitting diode (LED) curtain display and a flexible LED array. LightResources is defined as a color (including grayscale) video or image of m × n pixels and matched to an m × n arrayed light actuator. |
| LightSamplesFlag | This field, represented in binary, designates a choice of a arrayed light source. "1" means that LightSamples is present; otherwise, LightResource is present. |
| NbrOfLightSampleMatrix | A number of LightSamples matrices |
| SizeOfLightSamplesRow | A row size of LightSamples |
| SizeOfLightSamplesColumn | A column size of LightSamples |
| LightSamples | Describing m × n color samples of the arrayed light effect used by an arrayed light actuator. LightSamples is determined in units of colorType which references to a classification scheme term or an RGB value. The m × n color matrix of LightSamples is linearly extended based on nbrOfColumns and nbrOfRows of a capability of the arrayed light actuator. For example, an arrayed light effect is determined based on 100 × 100 color samples and the number of rows and columns of the arrayed light actuator are 200 and 300, respectively. In this example, an adaptation engine linearly extends the 100 × 100 arrayed light effect to a 200 × 300 matrix of the arrayed light actuator. |
| LightResource | A type of a light resource The m × n color pixels, for example, the arrayed light effects of a video or image may be linearly extended based on nbrOfRows and nbrOfColumns of the capability of the arrayed light actuator. A matrix adaptation is same as that of LightSamples. |
| upateRateFlag | This field, represented in binary, signals a presence of an updateRate attribute. "1" means that the updateRate attribute is present; otherwise, the updateRate attribute is absent. |
| updateRate | A number of data updates per second For example, a value of 2 means an arrayed light device changes a value twice per second. |

In an example, as shown in Table 68, an arrayed light effect may be described using LightSample based on a 6×12 color matrix. The arrayed light effect may be activated at si:pts="2" and represent two 6×6 color matrices in one second due to updateRate="2." In another example, an arrayed light effect may be described using LightResource with the following semantics. A set of light array information may be provided by a light source movie file and 30 frames of light array information are given per second. The arrayed light effect may be activated at si:pts="5."

TABLE 68

```
<sedl:DescriptionMetadata>
    <sedl:ClassificationSchemeAlias .    alias="WCS" .    href="urn:mpeg:mpeq-v:01-SI-
PositionCS-NS"/>
</sedl:DescriptionMetadata>

<sedl:Effect .  xsi:type="sev:ArrayedLightType" .  updateRate="2" .  activate="true" .
si:pts="2">
    <sev:LightSamples .mpeg7:dim="6.12">
    . . . . . # 000000 . . #0000FF . #0000FF . . #0000FF . #0000FF . . #000000
    . . . . . # 000000 . . #0000FF . #000000 . . #000000 . #000000 . . #000000
    . . . . . # 000000 . . #0000FF . #0000FF . . #0000FF . #0000FF . . #000000
    . . . . . # 000000 . . #0000FF . #000000 . . #000000 . #000000 . . #000000
    . . . . . # 000000 . . #0000FF . #000000 . . #000000 . #000000 . . #000000
```

TABLE 68-continued

```
..... # 000000 ...#0000FF . #0000FF .. #0000FF .. #0000FF .. #000000
..... #0000FF...#0000FF . #0000FF .. #0000FF .. #000000 .. #000000
..... #0000FF...#000000 . #000000 .. #000000 .. #000000 .. #000000
..... #0000FF...#0000FF . #0000FF .. #0000FF .. #000000 .. #000000
..... #0000FF...#000000 . #000000 .. #000000 .. #000000 .. #000000
..... #0000FF...#000000 . #000000 .. #000000 .. #000000 .. #000000
..... #0000FF...#000000 . #0000FF .. #0000FF .. #000000 .. #000000
   </sev:LightSamples>
</sedl:Effect>

<sedl:Effect . xsi:type="sev:ArrayedLightType" . updateRate="30" . activate="true" . si:pts="5">
   <sev:LightResource .type="video/mp4".ref="sample.mp4"/>
</sedl: .Effect>
</Effect>
```

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sensory effect adaptation method, comprising:
   identifying a sensory effect; and
   providing the sensory effect from a virtual world to an adaptation engine for converting the sensory effect into commands applied to a real world,
   wherein the sensory effect includes an arrayed light effect,
   wherein the arrayed light effect is defined based on an ArrayedLightType, the ArrayedLightType comprising:
   (i) a NbrOfLightSampleMatrix which is a number of LightSamples matrices;
   (ii) a SizeOfLightSamplesRow which is a row size of each of the LightSamples matrices;
   (iii) a SizeOfLightSamplesColumn which is a column size of each of the LightSamples matrices;
   (iv) a LightSamples which is mxn color samples of the arrayed light effect used by an arrayed light actuator, wherein a mxn color matrix of LightSamples is linearly extended based on nbrOfColumns and nbrOfRows of a capability of the arrayed light actuator, m and n respectively corresponding to the row size and the column size of each of the LightSamples matrices;
   (v) a LightResource which is a type of a light resource; and
   (vi) a updateRate which is a number of data updates per second, and wherein the sensory effect includes a light effect,
wherein the light effect is defined based on a LightType comprising:
(i) a color which describes a color of the light effect;
(ii) an intensity value which is an intensity of light effect described based on illumination in lux; and
(iii) an intensity-range which is a range of the intensity value.

2. The method of claim 1, wherein when a sensory effect list flag is "1," a sensory effect included in a sensory effect list is used and, when the sensory effect list flag is "0," the sensory effect included in the sensory effect list is not used.

3. The method of claim 1, wherein the sensory effect is described using a virtual world object sensory effect type,
wherein the virtual world object sensory effect type includes:
(i) a VWOSensoryEffectType which is a type including a description of the sensory effect associated with the virtual world object;
(ii) an effect which is the sensory effect; and
(iii) a GroupofEffect which is a group of sensory effects by grouping for removing redundancy from child elements, wherein all attributes included in the group are inherited to the child elements.

4. The method of claim 1, wherein the sensory effect includes a scent effect,
wherein the scent effect is defined based on a ScentType comprising:
(i) a scent which describes whether to use the scent;
(ii) an intensity value which is intensity of scent effect represented in milliliter per hour; and
(iii) a range of the intensity value.

* * * * *